(12) United States Patent
Balasubramanian et al.

(10) Patent No.: US 11,488,480 B1
(45) Date of Patent: Nov. 1, 2022

(54) PASSIVE VEHICLE-TO-PEDESTRIAN SYSTEM

(71) Applicant: QUALCOMM Incorporated, San Diego, CA (US)

(72) Inventors: Anantharaman Balasubramanian, San Diego, CA (US); Kapil Gulati, Belle Mead, NJ (US); Sudhir Kumar Baghel, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/370,905

(22) Filed: Jul. 8, 2021

(51) Int. Cl.
| G08G 1/16 | (2006.01) |
| H04W 4/06 | (2009.01) |
| H04W 4/02 | (2018.01) |
| H04W 4/40 | (2018.01) |

(52) U.S. Cl.
CPC ............ *G08G 1/166* (2013.01); *H04W 4/027* (2013.01); *H04W 4/06* (2013.01); *H04W 4/40* (2018.02)

(58) Field of Classification Search
CPC ........ G08G 1/166; H04W 4/40; H04W 4/027; H04W 4/06
See application file for complete search history.

(56) References Cited

U.S. PATENT DOCUMENTS

| 2010/0105445 A1* | 4/2010 | Brunton | .............. | H04M 1/6066 455/567 |
| 2010/0330952 A1* | 12/2010 | Yeoman | ............ | H04M 1/72424 455/404.2 |
| 2021/0092796 A1* | 3/2021 | Kumar | .................. | H04W 76/50 |

* cited by examiner

*Primary Examiner* — Joshua L Schwartz
(74) *Attorney, Agent, or Firm* — Campbell C. Chiang

(57) ABSTRACT

Aspects presented herein may enable vehicle UE(s) to transmit warning message(s) to one or more pedestrian UEs without receiving P2V transmissions from the one or more pedestrian UEs. In one aspect, a first UE determines one or more configuration parameters for a plurality of second UEs, the one or more configuration parameters including an identification parameter, the identification parameter being associated with a time period. The first UE determines, based on the identification parameter for at least one second UE of the plurality of second UEs, whether to transmit a warning message to the at least one second UE. The first UE transmits, based on determining to transmit the warning message, the warning message to the at least one second UE, the warning message including an ID for the at least one second UE, the ID for the at least one second UE being based on the identification parameter.

30 Claims, 16 Drawing Sheets

PASSIVE VEHICLE-TO-PEDESTRIAN SYSTEM

TECHNICAL FIELD

The present disclosure relates generally to communication systems, and more particularly, to wireless communication involving sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus determines one or more configuration parameters for a plurality of second user equipments (UEs), the one or more configuration parameters including an identification parameter, the identification parameter being associated with a time period. The apparatus determines, based on the identification parameter for at least one second UE of the plurality of second UEs, whether to transmit a warning message to the at least one second UE. The apparatus transmits, based on determining to transmit the warning message, the warning message to the at least one second UE, the warning message including an identifier (ID) for the at least one second UE, the ID for the at least one second UE being based on the identification parameter.

In an aspect of the disclosure, a method, a computer-readable medium, and an apparatus are provided. The apparatus receives an indication of one or more configuration parameters for the second UE, the one or more configuration parameters including an identification parameter, the identification parameter being associated with a time period. The apparatus receives, from at least one first UE, a warning message for the second UE, the warning message including an ID for the second UE, the ID for the second UE being based on the identification parameter. The apparatus determines, based on the warning message, whether at least one distance metric is less than a threshold. The apparatus performs a warning action if the at least one distance metric is less than the threshold or ignoring the warning action if the at least one distance metric is greater than or equal to the threshold.

In an aspect of the disclosure, a method, a computer-readable medium, and an apparatus are provided. The apparatus configures one or more configuration parameters for a plurality of second UEs, the one or more configuration parameters including an identification parameter, the identification parameter being associated with a time period. The apparatus transmits, to at least one of at least one first UE or the plurality of second UEs, an indication of the one or more configuration parameters for the plurality of second UEs including the identification parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
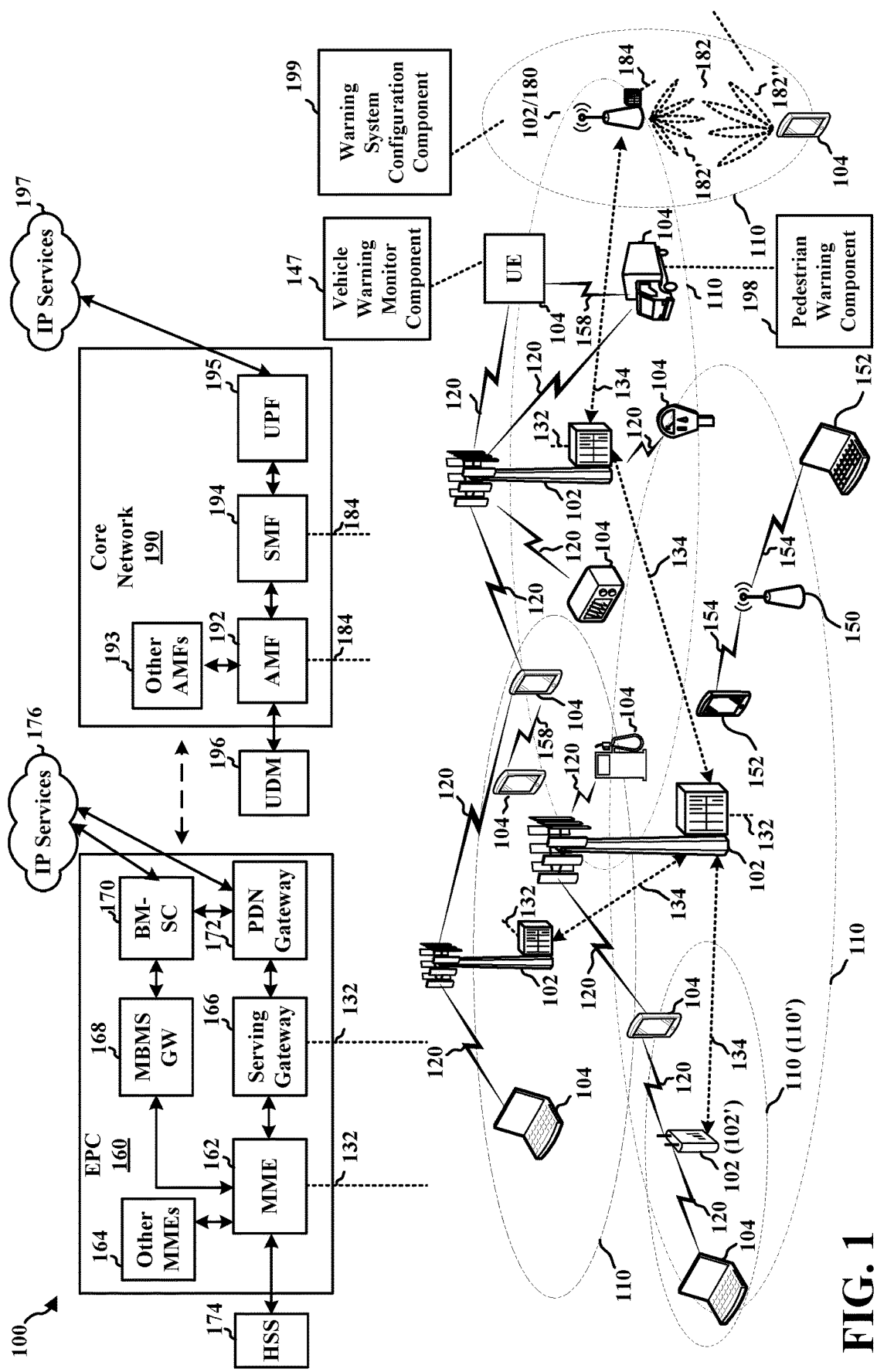
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may enable a vehicle (e.g., a vehicle UE) to transmit one or more warning messages to one or more pedestrians (e.g., pedestrian UEs) without receiving P2V transmission (e.g., the identity message) from the one or more pedestrians. Aspects presented herein may provide a passive warning system for pedestrians in a V2P system, where pedestrians may be warned by a vehicle when they are in a collision course or a potential collision course with the vehicle without transmitting their identities to the vehicle.

In certain aspects, the UE 104 (e.g., a vehicle UE) may include a pedestrian warning component 198 configured to monitor and identify one or more pedestrians based on their movements and to transmit a warning message to their UEs (e.g., pedestrian UEs) if the pedestrians are in a collision course or a potential collision course with the vehicle carrying the UE 104. In one configuration, the pedestrian warning component 198 may be configured to determine one or more configuration parameters for a plurality of second UEs, the one or more configuration parameters including an identification parameter, the identification parameter being associated with a time period. In such configuration, the pedestrian warning component 198 may determine, based on the identification parameter for at least one second UE of the plurality of second UEs, whether to transmit a warning message to the at least one second UE. In such configuration, the pedestrian warning component 198 may transmit, based on determining to transmit the warning message, the warning message to the at least one second UE, the warning message including an ID for the at least one second UE, the ID for the at least one second UE being based on the identification parameter.

In certain aspects, the UE 104 (e.g., a pedestrian UE) may include a vehicle warning monitor component 147 configured to monitor for warning message(s) from one or more vehicle UEs and to perform warning actions if the second UE determines that the warning message is directed to the second UE and optionally the distance between the second UE and the vehicle UE transmitting the warning message is below a threshold. In one configuration, the vehicle warning monitor component 147 may be configured to receive an indication of one or more configuration parameters for the second UE, the one or more configuration parameters including an identification parameter, the identification parameter being associated with a time period. In such configuration, the vehicle warning monitor component 147 may receive, from at least one first UE, a warning message for the second UE, the warning message including an ID for the second UE, the ID for the second UE being based on the identification parameter. In such configuration, the vehicle warning monitor component 147 may determine, based on the warning message, whether at least one distance metric is less than a threshold. In such configuration, the vehicle warning monitor component 147 may perform a warning action if the at least one distance metric is less than the threshold or ignoring the warning action if the at least one distance metric is greater than or equal to the threshold.

In certain aspects, the base station 102/180 may include a warning system configuration component 199 configured to configure an identifier mechanism to one or more vehicle UEs and one or more pedestrian UEs, such as based on location, velocity, and/or acceleration measurements over the last 'n' time instants and/or time windows. In one configuration, the warning system configuration component 199 may configure one or more configuration parameters for a plurality of second UEs, the one or more configuration parameters including an identification parameter, the identification parameter being associated with a time period. In such configuration, the warning system configuration component 199 may transmit, to at least one of at least one first UE or the plurality of second UEs, an indication of the one or more configuration parameters for the plurality of second UEs including the identification parameter.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
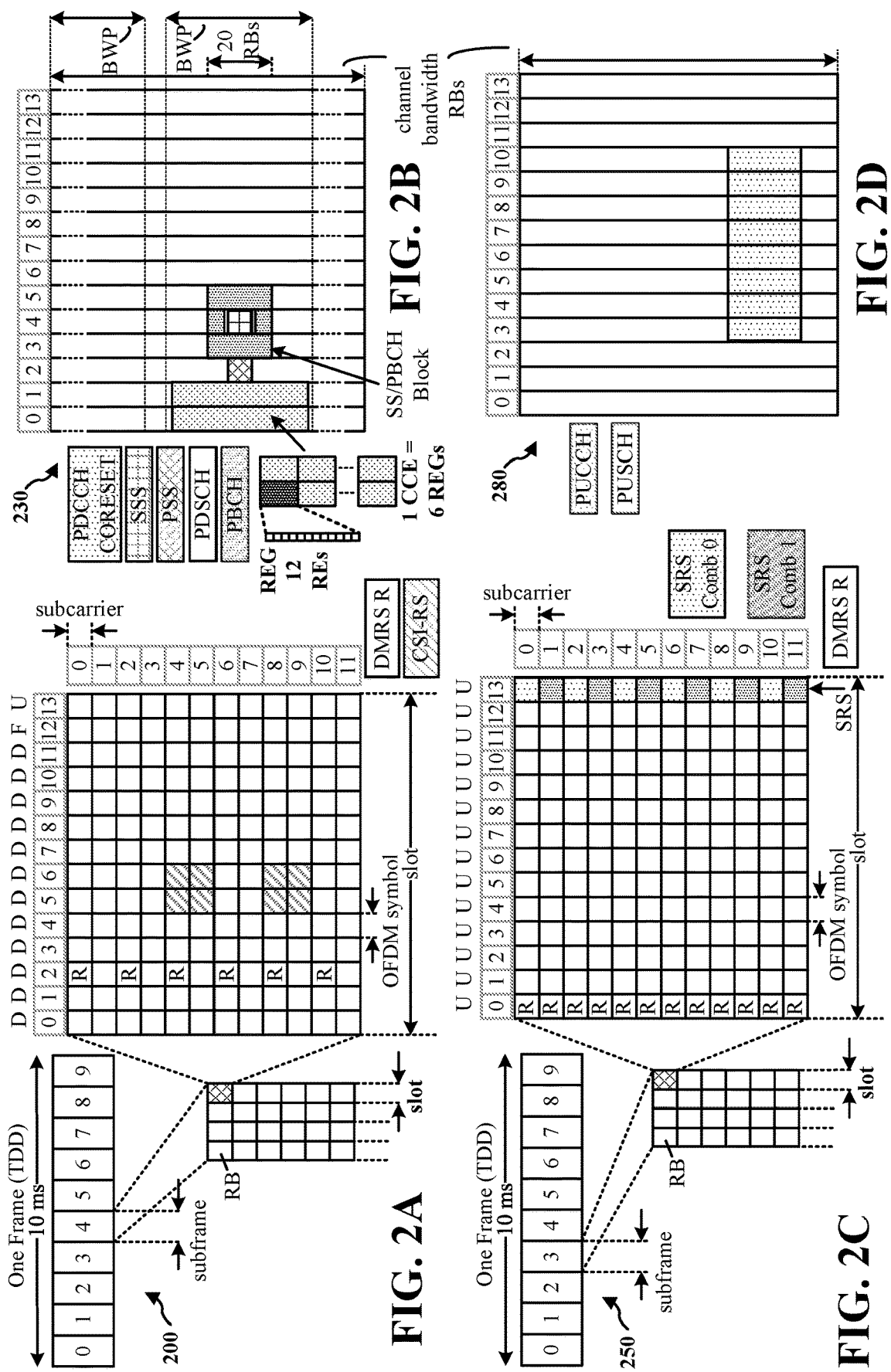
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2\mu$ slots/subframe. The subcarrier spacing may be equal to $2\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
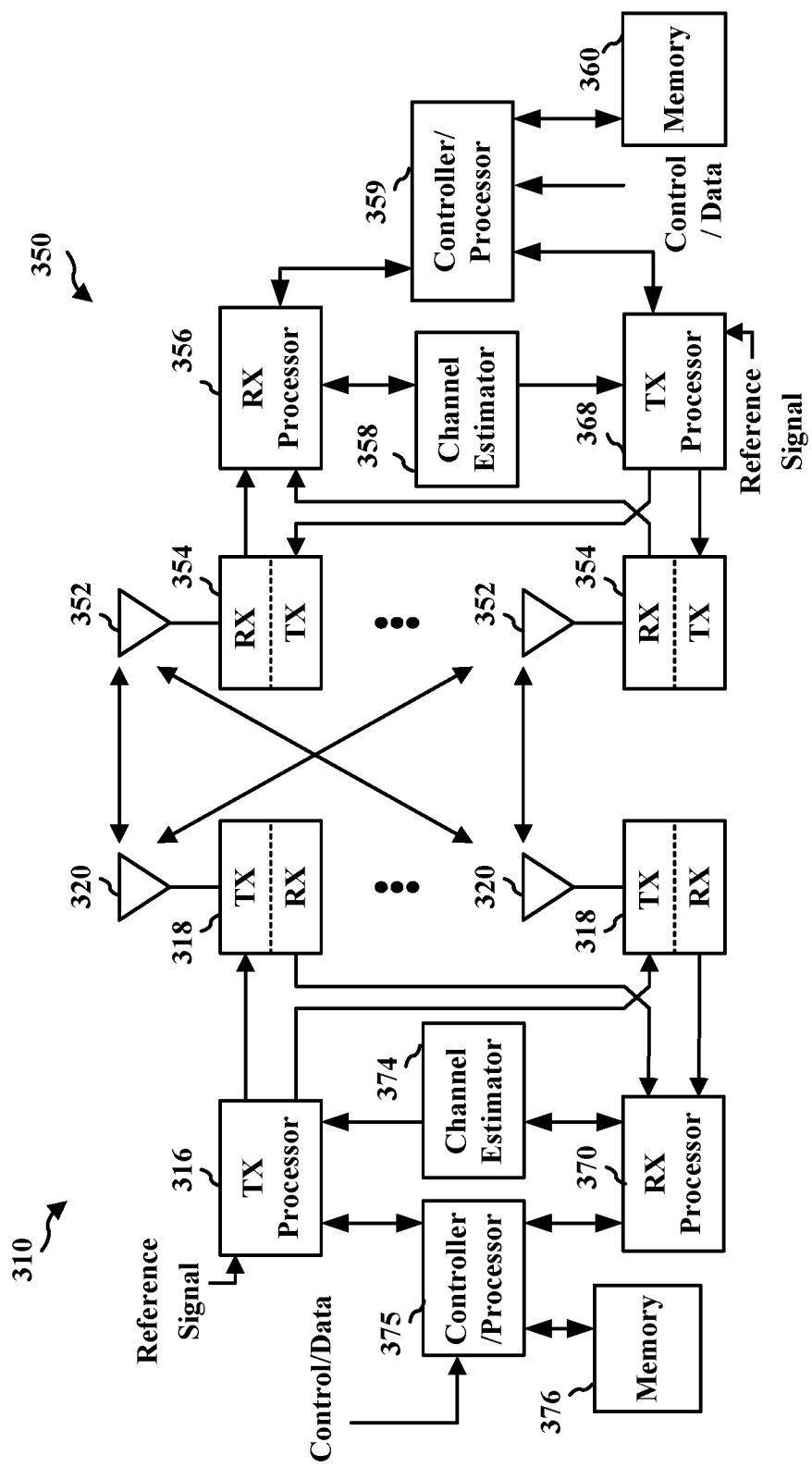
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the pedestrian warning component 198 and/or the vehicle warning monitor component 147 of FIG. 1.

At least one of the TX processor 316, the RX processor 370, and the controller/processor 375 may be configured to perform aspects in connection with the warning system configuration component 199 of FIG. 1.

Referring back to FIG. 1, a link between a UE 104 and a base station 102 or 180 may be established as an access link, e.g., using a Uu interface. Other communication may be exchanged between wireless devices based on sidelink communication. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), pedestrian-to-vehicle (P2V), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU), etc. Sidelink communication may be exchanged using a PC5 interface.

Figure 4:
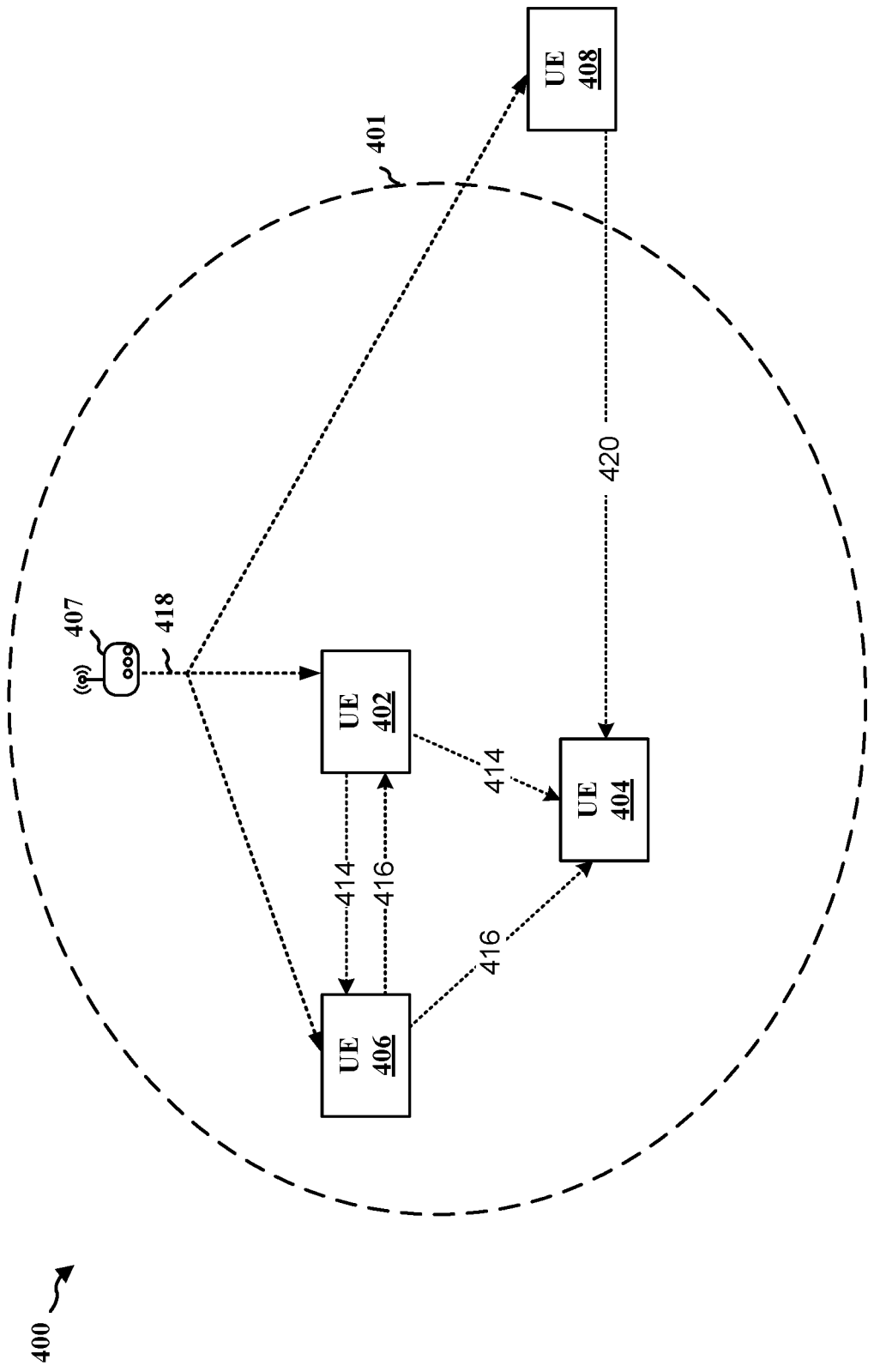
FIG. 4 is a diagram illustrating an example of wireless communication between devices based on sidelink communication in accordance with various aspects of the present disclosure.

FIG. 4 is a diagram 400 illustrating an example of wireless communication between devices based on sidelink communication. In one example, a UE 402 may transmit a transmission 414, e.g., including a control channel (e.g., a PSCCH) and/or a corresponding data channel (e.g., a PSSCH), that may be received by receiving UEs 404, 406. A control channel may include information for decoding a data channel and may also be used by a receiving device to avoid interference by refraining from transmitting on the occupied resources during a data transmission. The number of transmission time intervals (TTIs), as well as the RBs that will be occupied by the data transmission, may be indicated in a control message (e.g., a sidelink control information (SCI) message) from a transmitting device. The UEs 402, 404, 406, 408 may each have the capability to operate as a transmitting device in addition to operating as a receiving device. Thus, UEs 406, 408 are illustrated as transmitting the transmissions 416 and 420. The transmissions 414, 416, 420 may be broadcast or multicast to nearby devices. For example, the UE 402 may transmit communication (e.g., data) for receipt by other UEs within a range 401 of the UE 402. Additionally, or alternatively, the RSU 407 may receive communication from and/or transmit communication 418 to UEs 402, 406, 408.

Sidelink communication that is exchanged directly between devices may include discovery messages for sidelink UEs to find nearby UEs and/or may include sensing of resource reservations by other UEs in order to select resources for transmission. Sidelink communication may be based on different types or modes of resource allocation mechanisms. In a first resource allocation mode (which may be referred to herein as "Mode 1" or "sidelink Mode 1"), centralized resource allocation may be provided. For example, a base station 102 or 180 may determine resources for sidelink communication and may allocate resources to different UEs 104 to use for sidelink transmissions. In this first mode, a sidelink UE may receive the allocation of sidelink resources from the base station 102 or 180. In a second resource allocation mode (which may be referred to herein as "Mode 2" or "sidelink Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. These resource allocation mechanisms for sidelink may provide power savings, e.g., at a physical layer or a medium access control (MAC) layer. Power savings may be helpful in sidelink applications such as public safety applications, commercial applications, wearables, etc., which may include both periodic and aperiodic traffic.

Figure 5:
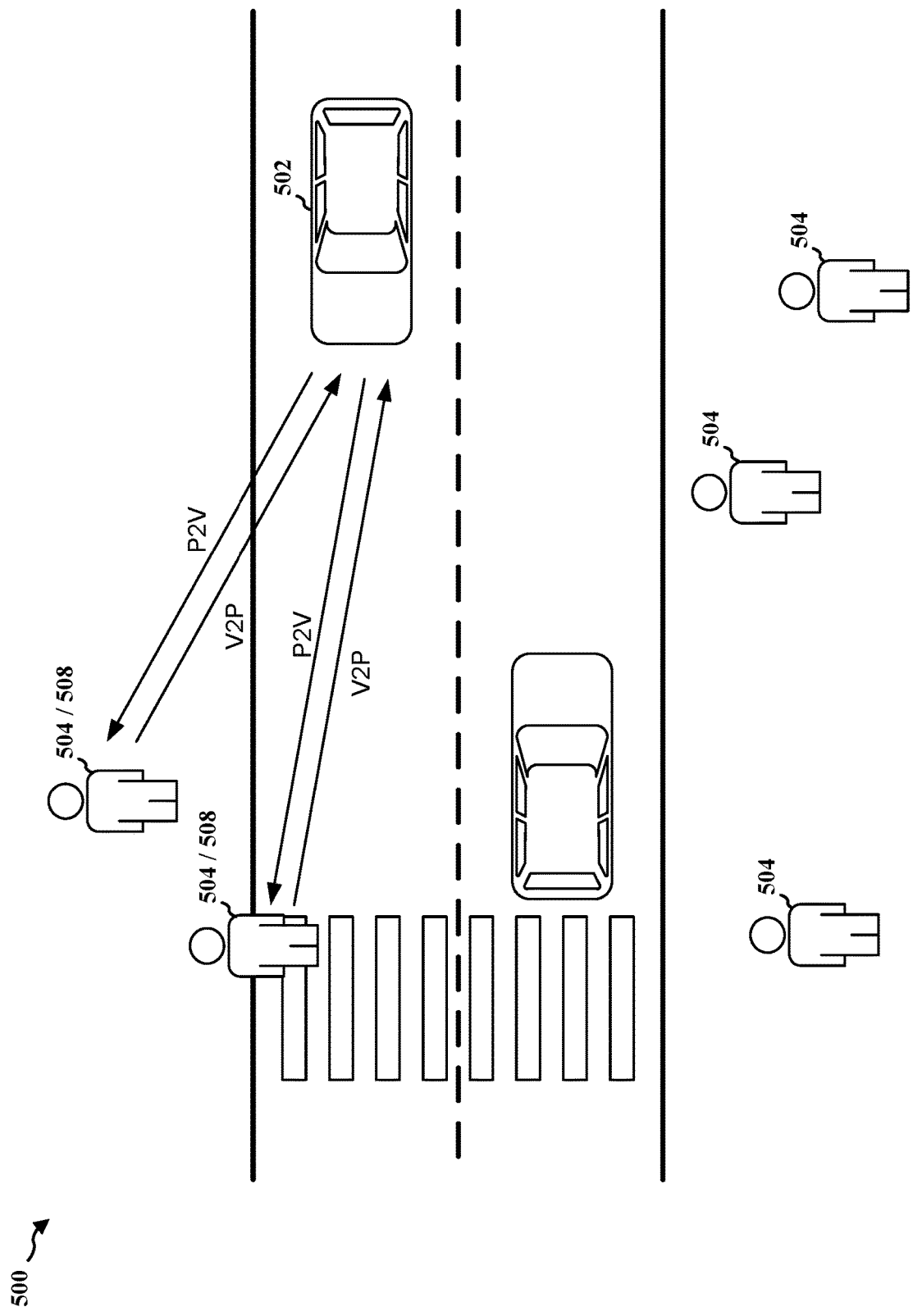
FIG. 5 is a diagram illustrating an example of sidelink communication between vehicle(s) and pedestrian(s) in accordance with various aspects of the present disclosure.

FIG. 5 is a diagram 500 illustrating an example of sidelink communication between vehicle(s) and pedestrian(s) 504 (e.g., V2P/P2V) in accordance with various aspects of the present disclosure. A vehicle 502 may be driving on a road with pedestrians 504 in proximity with the vehicle 502, such as in an urban area. In some examples, road safety may be improved if one or more of the pedestrians 504 (e.g., pedestrians 508) are able to be notified when they are in a collision course or a potential collision course with the vehicle 502, such that the pedestrians may be made aware of the coming vehicle 502. For example, if the vehicle 502 is able to identify the pedestrians 508 that may be in its collision course or potential collision course, the vehicle 502 (e.g., the vehicle 502's associated UE) may transmit a warning message (e.g., a V2P message) to the pedestrians 508 (e.g., to their associated UEs) in advance.

In some examples, for the vehicle 502 to be able to transmit the warning message to the pedestrians 508, the pedestrians 508 may first transmit their identities to the vehicle 502, such as via a P2V message, so that the vehicle 502 is able to identify the identities of the pedestrians 508. As such, if the pedestrians 508 are unable to transmit their identities to the vehicle 502, the vehicle 502 may not be able to identify the identities of the pedestrians 508 and may not be able to transmit the warning message to the pedestrians 508. In addition, sidelink transmit power for P2V messages (e.g., power consumed by pedestrian's wireless device or UE for transmitting P2V messages) may be much larger than power consumed for monitoring (e.g., for receiving) V2P messages. As a pedestrian's wireless device may largely rely on battery power, transmission of P2V (e.g., identity) messages may further increase power consumption of the wireless device.

Aspects presented herein may enable a vehicle (e.g., the vehicle 502) to transmit one or more warning messages to one or more pedestrians (e.g., the pedestrians 508) without receiving P2V transmission (e.g., the identity message) from the one or more pedestrians. Aspects presented herein may provide a passive warning system for pedestrians in a V2P system, where pedestrians may be warned by a vehicle when they are in a collision course or a potential collision course with the vehicle without transmitting their identities to the vehicle.

In one aspect of the present disclosure, one or more pedestrians (e.g., pedestrians 508) may be identified (e.g., by the pedestrian's UE and/or the vehicle's UE) based at least in part on their movements (e.g., moving direction(s), trajectories, etc.) over a period of time. For example, as pedestrians may move randomly, the path (or one or more parameters associated to the path) traversed by each pedestrian may be different with high probability with increasing time. As such, the parameters of the path traversed by each pedestrian may be used by the vehicle UE and the pedestrian UE as a unique identifier to identify each pedestrian. In other words, a vehicle UE may be able to identify one or more pedestrians based on their movements, while the one or more pedestrians may already be aware of their own movements (e.g., using sensors of their associated pedestrian UEs). For example, a pedestrian UE may record movements of the pedestrian (e.g., its user) over a period of time using the pedestrian UE's sensors (e.g., inertia sensors, oscilloscope, GPS, etc.) and the vehicle UE may also record movements of the pedestrian over the period of time using the vehicle UE's sensors (e.g., camera, radar, etc.). Then, the movements of the pedestrian over the period of time may be used by the pedestrian UE and the vehicle UE as the pedestrian's identification. Thus, if the vehicle UE is to transmit a warning message to the pedestrian, the vehicle UE may broadcast/transmit the warning message that include s the pedestrian's identification (e.g., the pedestrian's movements over the period of time), and the pedestrian UE may monitor for warning message(s) that include the pedestrian's identification. If the warning message includes the pedestrian's identification, the pedestrian UE may notify the pedestrian (e.g., may perform a warning action) regarding the warning message. As such, the pedestrian UE may receive the warning message without transmitting the pedestrian or the pedestrian UE's identify to the vehicle UE and/or without communicating with the vehicle UE first.

Figure 6:
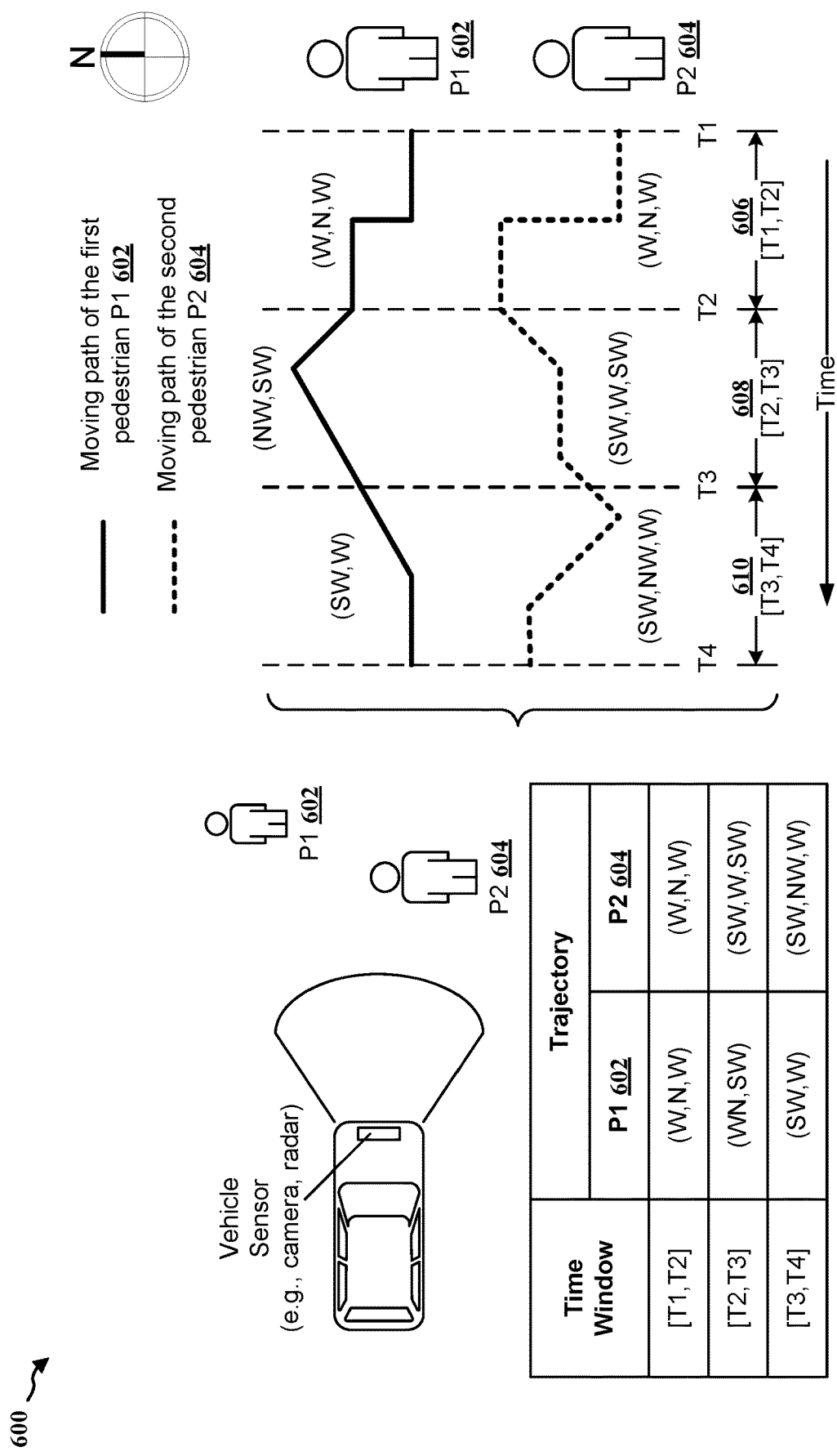
FIG. 6 is a diagram illustrating an example of associating pedestrians' identities with their movement directions over a period of time in accordance with various aspects of the present disclosure.

FIG. 6 is a diagram 600 illustrating an example of associating pedestrians' identities based on their movement directions over a period of time in accordance with various aspects of the present disclosure. In one example, a first pedestrian 602 (e.g., P1) and a second pedestrian 604 (e.g., P2) may be moving over a period of time (e.g., from time T1 to time T4), where their movement directions may be tracked by their wireless devices (e.g., mobile phones, smart watches, pedestrian UEs, etc.) and by one or more vehicle's sensors (e.g., camera, radar, distance sensor, etc.) in different time windows. For example, as shown at 606, at a time window between a first point in time (e.g., T1) and a second point in time (e.g., T2), the first pedestrian 602 may move toward west (W), then toward north (N), and then toward west again. The second pedestrian 604 may also move toward west (W), then toward north (N), and then toward west. As shown at 608, at a time window between the second point in time (e.g., T2) and a third point in time (e.g., T3), the first pedestrian 602 may move toward northwest (NW), and then toward southwest (SW). The second pedestrian 604 may move toward southwest, then toward west, and then toward southwest. As shown at 610, at a time window between the third point in time (e.g., T3) and a fourth point in time (e.g., T4), the first pedestrian 602 may continue to move toward southwest, and then toward west. The second pedestrian 604 may continue to move toward southwest, then toward northwest, and then toward west, etc. As such, movement directions of the first pedestrian 602 and the second pedestrian 604 may be tracked in time windows: [T1, T2], [T2, T3] and [T3, T4], etc.

Though the path traversed by pedestrians may be identical on some time windows, they are more likely to be different on other time windows over time. For example, although the movement directions of the first pedestrian 602 and the second pedestrian 604 may be identical or similar in the time window [T1, T2], such as shown at 606, the probability of their movement directions being different is likely to increase over time. For example, as shown at 608 and 610, the first pedestrian 602 and the second pedestrian 604 may start to travel at a different direction, pace, and/or speed after T2 (e.g., at time windows [T2, T3] and [T3, T4]). Thus, an identifier may be constructed as a concatenation of directions tracked in the above time windows for the first pedestrian 602 and the second pedestrian 604, e.g., ID=[T1, T2], [T2, T3], [T3, T4]. In other words, unique identifications of pedestrians may be generated with a high probability based at least in part on their movements when the time windows considered increase (e.g., becomes large).

As such, one or more pedestrians (e.g., pedestrians 508) may be identified (e.g., by the pedestrian's UE and/or the vehicle) based at least in part on their location, velocity, and/or acceleration at different time instants or time windows of a preconfigured length (e.g., over the last 5 seconds, 10 seconds, etc.). For example, as pedestrians may move with different speeds at different times, the movement speeds by each pedestrian may be more likely to be different with a high probability corresponding to an increase in time. Therefore, the movement speeds of each pedestrian may also be used as a unique identifier for identifying each pedestrian. Then, a vehicle (e.g., a vehicle UE) may be able to identify one or more pedestrians based on their movement speed within a period of time.

Figure 7:
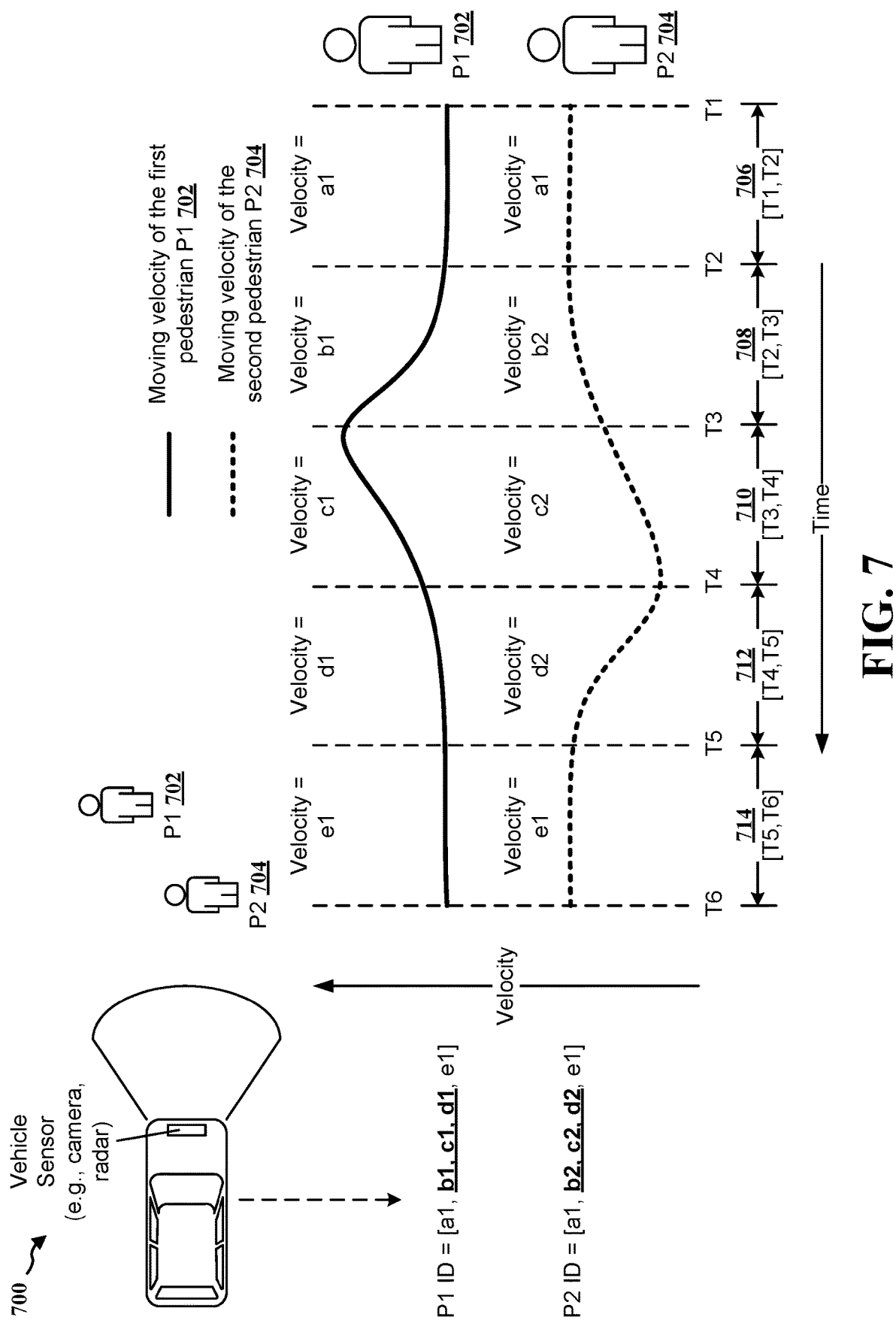
FIG. 7 is a diagram illustrating an example of associating pedestrians' identities with their movement velocities over a period of time in accordance with various aspects of the present disclosure.

FIG. 7 is a diagram 700 illustrating an example of associating pedestrians' identities based on their movement velocities over a period of time in accordance with various aspects of the present disclosure. In one example, a first pedestrian 702 (e.g., P1) and a second pedestrian 704 (e.g., P2) may be moving over a period of time, where their movement velocities may be tracked by their wireless devices (e.g., mobile phones, smart watches, pedestrian UEs, etc.) and by one or more vehicle's sensors (e.g., camera, radar, distance sensor, etc.) in different time windows. For example, as shown at 706, at a time window between a first point in time (e.g., T1) and a second point in time (e.g., T2), the first pedestrian 702 may be moving with velocity a1 (e.g., at 3 miles per hour), and the second pedestrian 704 may also be moving with velocity a1 (e.g., at 3 miles per hour). As shown at 708, at a time window between the second point in time (e.g., T2) and a third point in time (e.g., T3), the first pedestrian 702 may be moving with velocity b1 (e.g., at 3.2 miles per hour), and the second pedestrian 704 may be moving with velocity b2 (e.g., at 2.8 miles per hour). As shown at 710, at a time window between the third point in time (e.g., T3) and a fourth point in time (e.g., T4), the first pedestrian 702 may be moving with velocity c1 (e.g., at 3.5 miles per hour), and the second pedestrian 704 may be moving with velocity c2 (e.g., at 2.6 miles per hour). As shown at 712, at a time window between the fourth point in time (e.g., T4) and a fifth point in time (e.g., T5), the first pedestrian 702 may be moving with velocity d1 (e.g., at 3.1 miles per hour), and the second pedestrian 704 may be moving with velocity d2 (e.g., at 2.9 miles per hour). As shown at 714, at a time window between the fifth point in time (e.g., T5) and a sixth point in time (e.g., T6), the first pedestrian 702 may be moving with velocity e1 (e.g., at 3 miles per hour), and the second pedestrian 704 may also be moving with velocity e1 (e.g., at 3 miles per hour), etc. As such, movement velocities of the first pedestrian 702 and the second pedestrian 704 may be tracked in time windows: [T1, T2], [T2, T3], [T3, T4], [T4, T5], and [T5, T6].

Though the velocity of the pedestrians may be identical on some time windows, they are likely to be different on other time windows over time. For example, although the movement velocities of the first pedestrian 702 and the second pedestrian 704 may be identical or similar in time windows [T1, T2] and [T5, T6], such as shown at 706 and 714, the probability of their movement velocities being different is likely to increase over time, where they may be moving at different velocities at other time windows. For example, as shown at 708, 710 and 712, the first pedestrian 702 and the second pedestrian 704 may start to move at different velocities at time windows [T2, T3], [T3, T4], and [T4, T5]). Thus, an identifier (ID) may be constructed as a concatenation of velocities tracked in the above time windows for the first pedestrian 702 and the second pedestrian 704. For example, the first pedestrian 702 may be associated with an ID=[a1, b1, c1, d1, e1], whereas the second pedestrian 704 may be associated with an ID=[a1, b2, c2, d2, e1]. In other words, unique identifications of pedestrians may be generated with high probability based at least in part on their velocities when the time windows considered increase (e.g., becomes large). As such, the pedestrians (e.g., pedestrian UEs) may be addressed by a mutually agreed upon (with the vehicle UEs) a finite length path characteristic identifier.

In one example, the velocity measured at each time window (e.g., $[T_i, T_{i+1}]$) may be an absolute velocity measurement. For example, the velocities measured at the time windows [T1, T2], [T2, T3], [T3, T4], [T4, T5], and [T5, T6] may be absolute velocity measurements measured at times T1, T2, T3, T4 and T5 respectively. For example, if the first pedestrian 702 is moving at 3 miles per hour at T1 and at 3.2 miles per hour at T2, the first pedestrian 702 may be considered moving at 3 miles per hour at the time window [T1, T2] and moving at 3.2 miles per hour at the time window [T2, T3], etc. As such, a1 may be equal to the velocity measured at T1, and b1 may be equal to the velocity measured at T2.

In another example, the velocity measured at each time window may be an average velocity. For example, the velocity for the time window [T1, T2] may be an average velocity measured between times T1 and T2, the velocity for the time window [T2, T3] may be an average velocity measured between times T2 and T3, the velocity for the time window [T3, T4] may be an average velocity measured between times T3 and T4, etc. As such, if the first pedestrian 702 is moving at 3 miles per hour at T1 and at 3.2 miles per hour at T2, the average velocity of the first pedestrian 702 for the time window [T1, T2] may be 3.1 miles per hour (e.g., the average of 3.0 and 3.2 is 3.1). As such, a1 may be equal to the average velocity between times T1 and T2.

In another aspect of the present disclosure, a pedestrian's movement measurements (e.g., direction, trajectory, velocity, acceleration, location, etc.) may be quantized over a time period into multiple levels, where each of the multiple levels may include a range for the movement measurements. As the pedestrian's movements measured by different UEs (e.g., by the pedestrian UE and the vehicle UE) may not be the same or with offset(s), quantizing the pedestrian's movement measurements may enable the movement measurements obtained by the vehicle UE to be more likely to match the measurements obtained by the pedestrian UE. For example, referring back to FIG. 7, a velocity range between 1.1 to 1.5 miles per hour may be configured to be quantized into 1.3 miles per hour for the vehicle UE and the pedestrian UE (e.g., 702, 704). Thus, if the vehicle UE and the pedestrian UE obtain a velocity measurement (e.g., velocity of the pedestrian) between 1.1 and 1.5 miles per hour, the vehicle UE and the pedestrian UE may quantize their measurements to 1.3 miles per hour. Thus, if the movement measurements obtained by the vehicle UE and the pedestrian UE are not the same but are within the same quantization range, their measurements may still match after the quantization. For example, if the velocity measurement obtained by the vehicle UE is 1.2 miles per hour while the velocity measurement obtained by the pedestrian UE is 1.4 miles per hour, both of them may become 1.3 miles per hour after quantization. As such, the unique identification measured by the vehicle UE for the pedestrian (e.g., measurement of the pedestrian's movement over a time period) may be more likely to match the unique identification measured by the pedestrian's UE.

In one example, to enable quantization of movement measurements at a vehicle UE and a pedestrian UE, the vehicle UE and the pedestrian UE may be configured with a value N that is to be the length of the identifier (e.g., the pedestrian ID). Then, $P_i(m)$ and $V_i(m)$ may be the path measurements for parameter m (e.g., absolute velocity, mean of velocity, etc.) independently performed by the pedestrian UE and the vehicle UE, respectively, over a time period $[t_i, t_{i+1}]$. Assume, $|P_i(m)-V_i(m)| \leq E \forall i$, the range of the parameter m may be quantized into multiple levels based on E and a unique one-to-one mapping. For $m \in [m_1, m_K]$, with $m_1 < m_2 < \ldots m_K$. As such, $Q[m_1, m_2] \to a_1; \ldots Q[m_{K-1}, m_K] \to a_{K-1}$, where Q may be the quantization function and $a_i (1 \leq K-1)$ may represent the mapped quantity. Thus, the vehicle UE may use the N length identifier $\{a_i\}^N$ to warn the pedestrian (e.g., to transmit the warning message to the pedestrian UE).

In another example, the pedestrian UE may be configured to use a distance metric (e.g., Euclidean distance, Manhattan distance, Minkowski distance, and/or Hamming distance, etc.) to estimate or infer whether a warning message is addressed to it and/or whether the warning message is to be processed or ignored. The pedestrian UE may respond to the warning message (e.g., perform a warning action) when the distance metric is less than a preconfigured threshold, and the pedestrian UE may ignore the warning message (e.g., not perform a warning action) when the distance metric is larger than the preconfigured threshold. For example, a threshold of ten (10) meters may be configured for the distance metrics. If the pedestrian UE receives a warning message and the distance metric applied by the pedestrian UE indicates that the vehicle UE is more than ten meters away from the pedestrian UE, the pedestrian UE may ignore the warning message. However, if the distance metric applied by the pedestrian UE indicates that the vehicle UE is less than ten meters away from the pedestrian UE, the pedestrian UE may respond to the warning message, such as by warning the pedestrian carrying the pedestrian UE (e.g., by displaying an alert message, generating an alarm, and/or creating a vibration, etc.).

Figure 8:
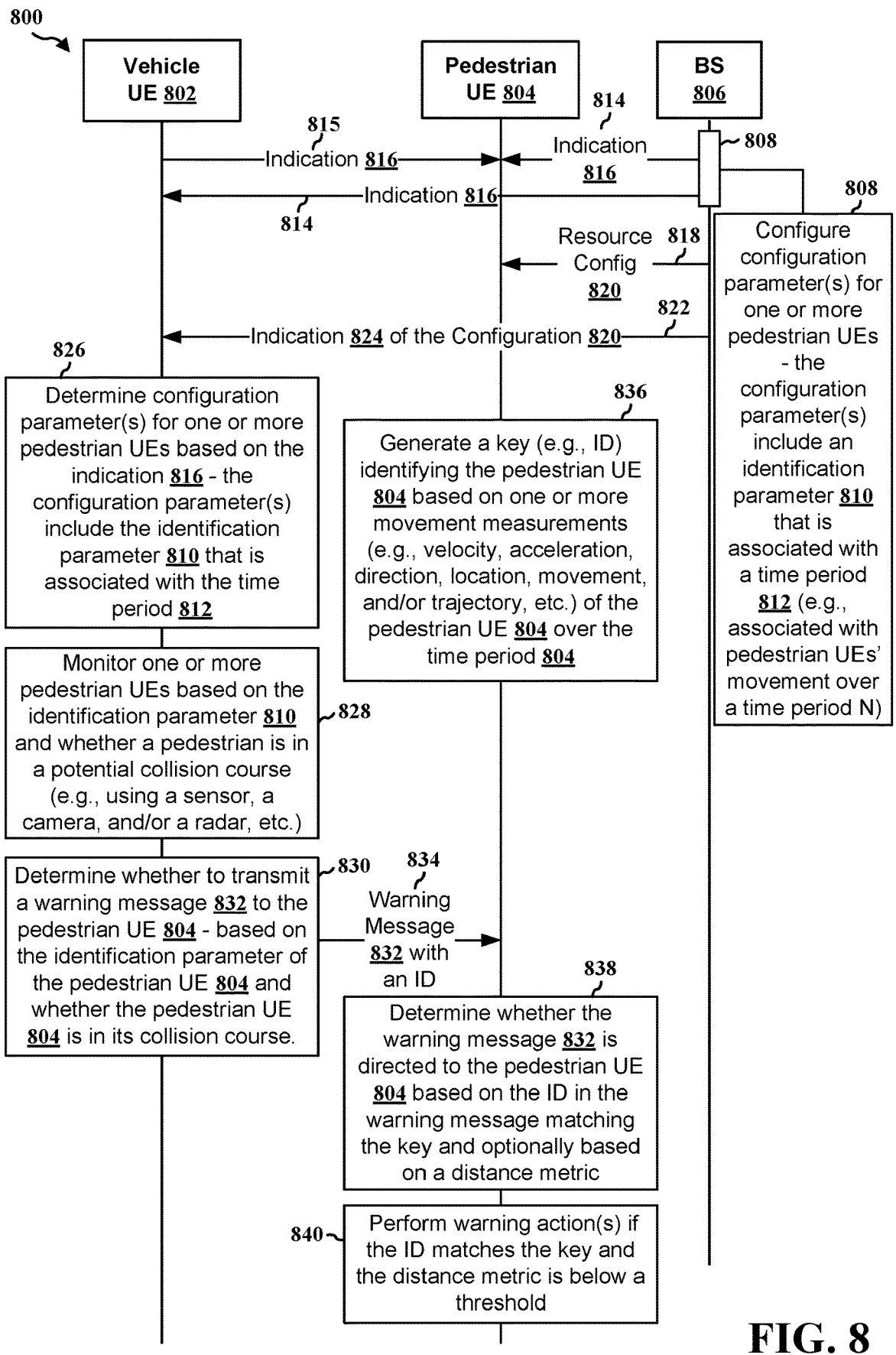
FIG. 8 is a communication flow between a vehicle UE, a pedestrian UE, and a base station illustrating of a passive vehicle-to-pedestrian (V2P) messaging in accordance with various aspects of the present disclosure.

FIG. 8 is a communication flow 800 between a vehicle UE, a pedestrian UE, and a base station illustrating of a passive V2P messaging in accordance with various aspects of the present disclosure.

At 808, a base station 806 may configure one or more configuration parameters for one or more pedestrian UEs, which may include a pedestrian UE 804. The one or more configuration parameters may include an identification parameter 810 that is associated with a time period 812 (e.g., a time length N, last N seconds, etc.). For example, the identification parameter 810 may be associated with one or more measurements for velocity, acceleration, direction, location, movement, and/or trajectory of the one or more pedestrian UEs over the time period 812, such as described in connection with FIGS. 6 and 7.

At 814, the base station 806 may transmit, to one or more vehicle UEs and one or more pedestrian UEs, including a vehicle UE 802 and the pedestrian UE 804, an indication 816 (or a configuration) of the one or more configuration parameters for the pedestrian UEs including the identification parameter 810. The indication 816 may be transmitted to the pedestrian UEs and/or the vehicle UEs via a broadcast message. In other words, the base station 806 may configure an identifier mechanism to the one or more vehicle UEs and the one or more pedestrian UEs, where the identifier mechanism may be associated with location, velocity, and/or acceleration measurements of one or more pedestrians over the last n time instants and/or time windows, such as described in connection with FIGS. 6 and 7.

In some examples, the base station 806 may transmit the indication 816 to the vehicle UE 802 and may not transmit the indication 816 to the pedestrian UE 804. In other examples, the one or more configuration parameters for the pedestrian UEs may be preconfigured at the vehicle UE 802, and the base station 806 may not transmit the indication 816 to the vehicle UE 802. In such examples, as shown at 815, the vehicle UE 802 may transmit the indication 816 to the pedestrian UE 804 instead, such as via a broadcast message. In other words, the vehicle UE 802 may broadcast the configuration parameter(s) to one or more pedestrian UEs that include the identification parameter 810. If the one or more pedestrian UEs (e.g., the pedestrian UE 804) receive the broadcasted configuration parameter(s), the pedestrian UE 804 may apply the configuration parameter(s) (e.g., to record the pedestrian's movement over the time period 812).

At 818, the base station 806 may configure at least one of a common resource pool or a wake-up cycle for the one or more pedestrian UEs, such as via a resource configuration 820. For example, the base station 806 may configure a common resource pool and/or wake-up cycle for the pedestrian UE 804, and information related to the common resource pool and/or the wake-up cycle may be used by the pedestrian UE 804 for monitoring possible warning messages from the one or more vehicle UEs, such as the vehicle UE 802. In other words, after the one or more pedestrian UEs are configured with the common resource pool and/or the wake-up cycle, the one or more pedestrian UEs may monitor for warning message(s) from one or more vehicle UEs based on the common resource pool and/or the wake-up cycle for the pedestrian UEs, where the one or more pedestrian UEs may receive the warning message(s) based on the monitoring.

At 822, the base station 806 may transmit, to the one or more vehicle UEs including the vehicle UE 802, an indication 824 (or information) for the at least one of a common resource pool or a wake-up cycle configured for the one or more pedestrian UEs. As such, the one or more vehicle UEs may become aware of when they may transmit a warning message to a pedestrian UE, such as during the wake-up cycle of the pedestrian UE. In some examples, the indication 824 for the resource configuration 820 may be transmitted with the indication 816 for the one or more configuration parameters.

At 826, after receiving the indication 816, the vehicle UE 802 may determine the configuration parameter(s) for the one or more pedestrian UEs based on the indication 816, where the configuration parameter(s) include the identification parameter 810 that is associated with the time period 812 (e.g., associated with pedestrian UEs' movement over the time period 812). For example, the indication 816 for the configuration parameter(s) may enable the vehicle UE 802 to know what type of movements (e.g., velocity, direction, acceleration, etc.) to monitor and measure for one or more pedestrians.

At 828, the vehicle UE 802 may monitor one or more pedestrians (e.g., including a pedestrian that is carrying the pedestrian UE 804) based on the identification parameter 810, such as by using a sensor, a camera, and/or a radar. For example, if the identification parameter 810 is associated with movement directions of a pedestrian, the vehicle UE 802 may monitor one or more pedestrians' movement direction through its sensor, camera and/or radar, such as described in connection with FIG. 6. If the identification parameter 810 is associated with velocity of a pedestrian, the vehicle UE 802 may monitor one or more pedestrians' velocity through its sensor, camera and/or radar, such as described in connection with FIG. 7. The vehicle UE 802 may also monitor whether any of the one or more pedestrians may be in a potential collision course with the vehicle UE 802, such as described in connection with FIG. 5.

At 830, based on the monitoring of the one or more pedestrians, the vehicle UE 802 may determine whether to transmit a warning message 832 to at least one of the one or more pedestrians monitored. For example, if the vehicle UE 802 monitors the pedestrian carrying the pedestrian UE 804 and determines that the pedestrian may be in a collision course or a potential collision course with the vehicle UE 802, the vehicle UE 802 may determine to transmit a warning message 832 to the pedestrian UE 804.

At 834, if the vehicle UE 802 determines that the pedestrian may be in a collision course or a potential collision course with the vehicle UE 802, the vehicle UE 802 may transmit the warning message 832 to the pedestrian UE 804, where the warning message 832 may include an identifier (ID) for the pedestrian UE 804 that is generated based on the identification parameter, such as described in connection with FIGS. 6 and 7. For example, the ID for the pedestrian UE 804 may be based on the one or more movement measurements for the pedestrian UE 804 over the time period 812 (e.g., over last N seconds, from time period $T_1$ to $T_N$, etc.). As such, the ID for the pedestrian UE 804 may change dynamically over time. In one example, the vehicle UE 802 may be configured to quantize the one or more movement measurements (e.g., velocity, acceleration, direction, location, movement, and/or trajectory) of the one or more pedestrians over the time period 812 into multiple levels, where each of the multiple levels may include a range for the one or more measurements, such as discussed in connection with FIG. 7.

In another example, the vehicle UE 802 may transmit the warning message 834 to the pedestrian UE 804 based on the at least one of the common resource pool or the wake-up cycle configured for the pedestrian UE 804 (e.g., based on the indication 824). In other words, as the indication 824 may indicate the common resource pool and/or wake-up cycles of the pedestrian UE 804, the vehicle UE 802 may transmit the warning message 832 to the pedestrian UE 804 based on the common resource pool during the wake-up cycles of the pedestrian UE 804. In another example, the warning message 834 may be transmitted to the pedestrian UE 804 via a broadcast message. In other words, the warning message 834 may be broadcasted to multiple pedestrian UEs within the vehicle UE 802's transmission range.

At 836, after the pedestrian UE 804 receives the indication 816, such as from the base station 806 (e.g., at 814) or from the vehicle UE 802 (e.g., at 812), the pedestrian UE 804 may also generate a key (e.g., an ID) identifying the pedestrian UE or the pedestrian carrying the pedestrian UE. For example, the key may be based on the one or more movement measurements associated with the pedestrian over the time period 812, such as described in connection with FIGS. 6 and 7. As such, the key for the pedestrian UE 804 may change dynamically over time as well. Similarly, the pedestrian UE 804 may also be configured to quantize the one or more movement measurements (e.g., velocity, acceleration, direction, location, movement, and/or trajectory) of the pedestrians over the time period 812 into multiple levels, where each of the multiple levels may include a range for the one or more measurements, such as discussed in connection with FIG. 7. Whether the vehicle UE 802 and the pedestrian UE 804 should apply quantization for the measurement may be configured or determined by the base station 806 and/or by the vehicle UE 802 (e.g., via indication 816 at 814 or 815).

At 838, after receiving the warning message 832 from the vehicle UE 802, the pedestrian UE 804 may determine whether the warning message 832 is directed to the pedestrian UE 804 based on whether the ID in the warning message 832 matches the key generated by the pedestrian UE 804. For example, referring back to FIG. 7, the vehicle UE may create an ID (e.g., [a1, b1, c1, d1, e1]) for the first pedestrian 702 based on the first pedestrian 702's velocity between the time periods T1 to T6 (e.g., over last ten seconds). Similarly, the first pedestrian 702's UE may also measure the first pedestrian 702's velocity, and may generate a key (e.g., [a1, b1, c1, d1, e1]) for the first pedestrian 702 based on the first pedestrian 702's velocity between the time periods T1 to T6 (e.g., over the same last ten seconds). If the vehicle UE transmits a warning message to the first pedestrian 702's UE that includes the ID, the first pedestrian 702's UE may determine whether the warning message is directed to the first pedestrian 702's UE based on whether the ID in the warning message matches the key generated by the first pedestrian 702's UE.

Referring back to FIG. 8, in one example, after determining that the warning message is directed to the pedestrian UE 804 (e.g., the ID in the warning message 832 matches the key generated by the pedestrian UE 804), the pedestrian UE 804 may optionally use a distance metric to determine whether to respond or process the warning message 832. For example, the pedestrian UE 804 may use the distance metric to determine whether a distance between the pedestrian UE 804 and the vehicle UE 802 is less than or greater than a threshold.

At 840, if the pedestrian UE 804 determines that the warning message 832 is directed to the pedestrian UE 804 and optionally the distance metric (e.g., the distance between the vehicle UE 802 and the pedestrian UE 804) is less than the threshold, the pedestrian UE 804 may be configured to perform a warning action to warn the pedestrian carrying the pedestrian UE 804, such as by displaying a warning message on the pedestrian UE's screen, generating an alarm or a notification sound, and/or creating a vibration, etc. On the other hand, if the pedestrian UE 804 determines that the warning message 832 is not directed to the pedestrian UE 804 or if the distance metric is not less than the threshold, the pedestrian UE 804 may be configured to ignore the warning message 832.

As such, aspects presented herein may enable the vehicle UE 802 to transmit one or more warning messages (e.g., the warning message 832) to one or more pedestrian UEs (e.g., the pedestrians UE 804) without receiving P2V transmission (e.g., the identity message) from the one or more pedestrian UEs, thereby providing a passive warning system for the one or more pedestrian UEs in a V2P system which may also reduce power consumption for the one or more pedestrian UEs.

Figure 9:
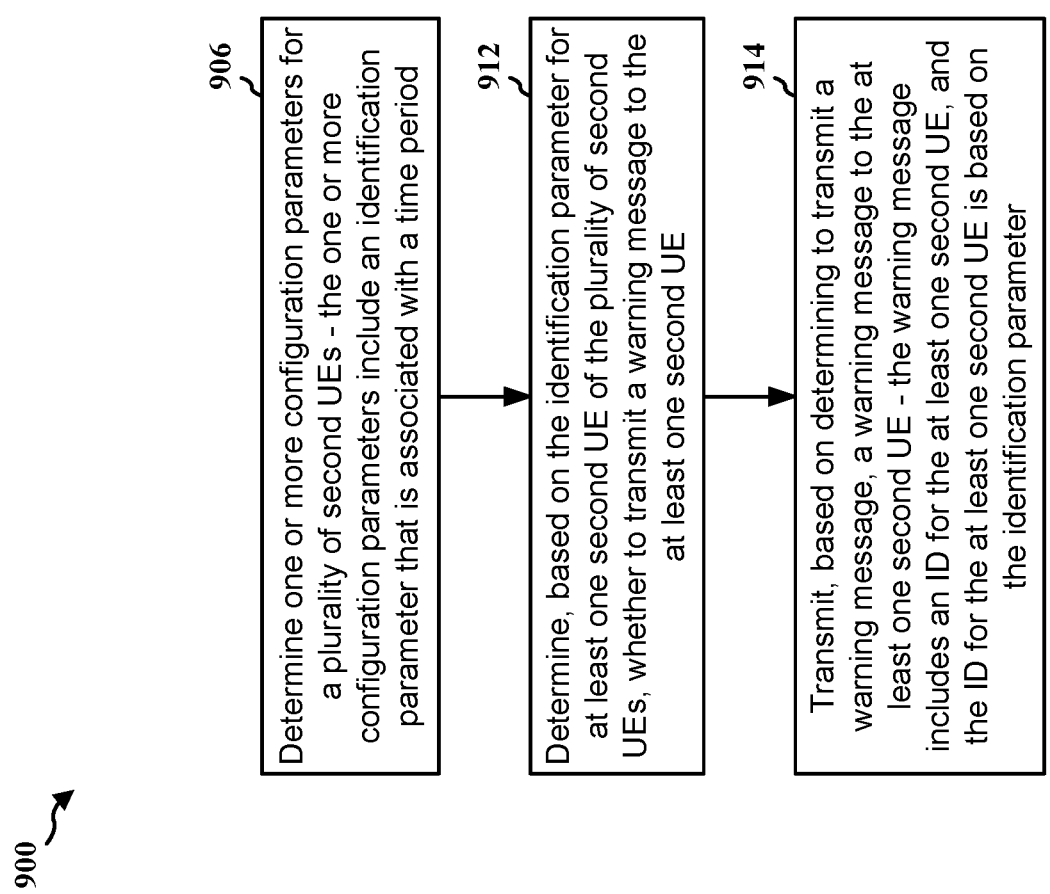
FIG. 9 is a flowchart of a method of wireless communication in accordance with aspects presented herein.

FIG. 9 is a flowchart 900 of a method of wireless communication. The method may be performed by a UE or a component of a UE (e.g., the UE 104, 350, 402, 404, 406, 408, 802; the apparatus 1102; a processing system, which may include the memory 360 and which may be the entire UE 350 or a component of the UE 350, such as the TX processor 368, the RX processor 356, and/or the controller/processor 359). The method may enable a first UE, such as a vehicle UE, to monitor and identify one or more pedestrians based on their movements and to transmit a warning message to their UEs (e.g., pedestrian UEs) if the pedestrians are in a collision course or a potential collision course with the vehicle carrying the first UE.

In one example, a first UE may receive, from a base station, an indication of the one or more configuration parameters for the plurality of second UEs, such as described in connection with FIG. 8. For example, at 814, the vehicle UE 802 may receive, from the base station 806, an indication 816 of the one or more configuration parameters for a plurality pedestrian UEs, which may include the pedestrian UE 804. The reception of the indication of the one or more configuration parameters may be performed by, e.g., the configuration parameter process component 1140 and/or the reception component 1130 of the apparatus 1102 in FIG. 11.

In one example, the first UE may transmit, to the plurality of second UEs via a broadcast message, an indication of the one or more configuration parameters including the identification parameter, such as described in connection with 815 of FIG. 8.

In one example, the first UE may receive, from a base station, an indication of at least one of a common resource pool or a wake-up cycle configured for the plurality of second UEs, such as described in connection with FIG. 8. For example, at 822, the vehicle UE 802 may receive, from the base station 806, an indication 824 of at least one of a common resource pool or a wake-up cycle (e.g., the configuration 820) configured for the one or more pedestrian UEs. The reception of the indication of at least one of a common resource pool or a wake-up cycle may be performed by, e.g., the resource and cycle process component 1142 and/or the reception component 1130 of the apparatus 1102 in FIG. 11.

At 906, the first UE may determine one or more configuration parameters for a plurality of second UEs, the one or more configuration parameters including an identification parameter, the identification parameter being associated with a time period, such as described in connection with FIG. 8. For example, at 826, the vehicle UE 802 may determine one or more configuration parameters for one or more pedestrian UEs based on the indication 816, where the one or more configuration parameters may include an identification parameter 89 that is associated with a time period 812. The determination of the one or more configuration parameters for the plurality of second UEs may be performed by, e.g., the configuration parameter determination component 1144 of the apparatus 1102 in FIG. 11.

In one example, the first UE may monitor the at least one second UE based on the identification parameter using at least one of a sensor, a camera, or a radar, such as described in connection with FIG. 8. For example, at 828, the vehicle UE 802 may monitor one or more pedestrian UEs (e.g., their user) based on the identification parameter 89 using at least one of a sensor, a camera, or a radar. The monitoring of the at least one second UE based on the identification parameter may be performed by, e.g., the pedestrian monitoring component 1146 of the apparatus 1102 in FIG. 11.

In one example, the first UE may determine, based on monitoring the at least one second UE, whether the at least one second UE is in a potential collision course with the first UE, such as described in connection with FIG. 8. For example, at 830, the vehicle UE 802 may determine, based on monitoring the one or more pedestrian UEs, whether the pedestrian UE 804 (e.g., its user) is in a potential collision course with the vehicle UE 802. The monitoring of the at least one second UE based on the identification parameter may be performed by, e.g., the pedestrian monitoring component 1146 and/or the collision course determination component 1148 of the apparatus 1102 in FIG. 11. The first UE may determine to transmit the warning message to the at least one second UE based on determining that the at least one second UE is in the potential collision course with the first UE.

At 912, the first UE may determine, based on the identification parameter for at least one second UE of the plurality of second UEs, whether to transmit a warning message to the at least one second UE, such as described in connection with FIG. 8. For example, at 830, the vehicle UE 802 may determine whether to transmit a warning message 832 to the pedestrian UE 804 based on the identification parameter of the pedestrian UE 804. The determination of whether to transmit a warning message may be performed by, e.g., the warning message determination component 1150 of the apparatus 1102 in FIG. 11.

At 914, the first UE may transmit, based on determining to transmit the warning message, the warning message to the at least one second UE, the warning message including an ID for the at least one second UE, the ID for the at least one second UE being based on the identification parameter, such as described in connection with FIG. 8. For example, at 834, the vehicle UE 802 may transmit a warning message 834 to the pedestrian UE 804, where the warning message may include an ID for the pedestrian UE 804. The transmission of the warning message may be performed by, e.g., the warning message process component 1152 and/or the transmission component 1134 of the apparatus 1102 in FIG. 11. The warning message may be transmitted to the at least one second UE via a broadcast message.

In one example, the first UE may transmit the warning message to the at least one second UE based on the at least one of the common resource pool or the wake-up cycle configured for the plurality of second UEs.

In another example, the identification parameter may include one or more measurements for at least one of velocity, acceleration, direction, location, movement, or trajectory associated with the plurality of second UEs over the time period. In such an example, the first UE may quantize the one or more measurements for at least one of velocity, acceleration, direction, location, movement, or trajectory associated with the plurality of second UEs over the time period into multiple levels, where each of the multiple levels may include a range for the one or more measurements.

In another example, the ID for the at least one second UE may be based on the one or more measurements for the at least one second UE over the time period. In such an example, the ID for the at least one second UE may change dynamically over time.

Figure 10:
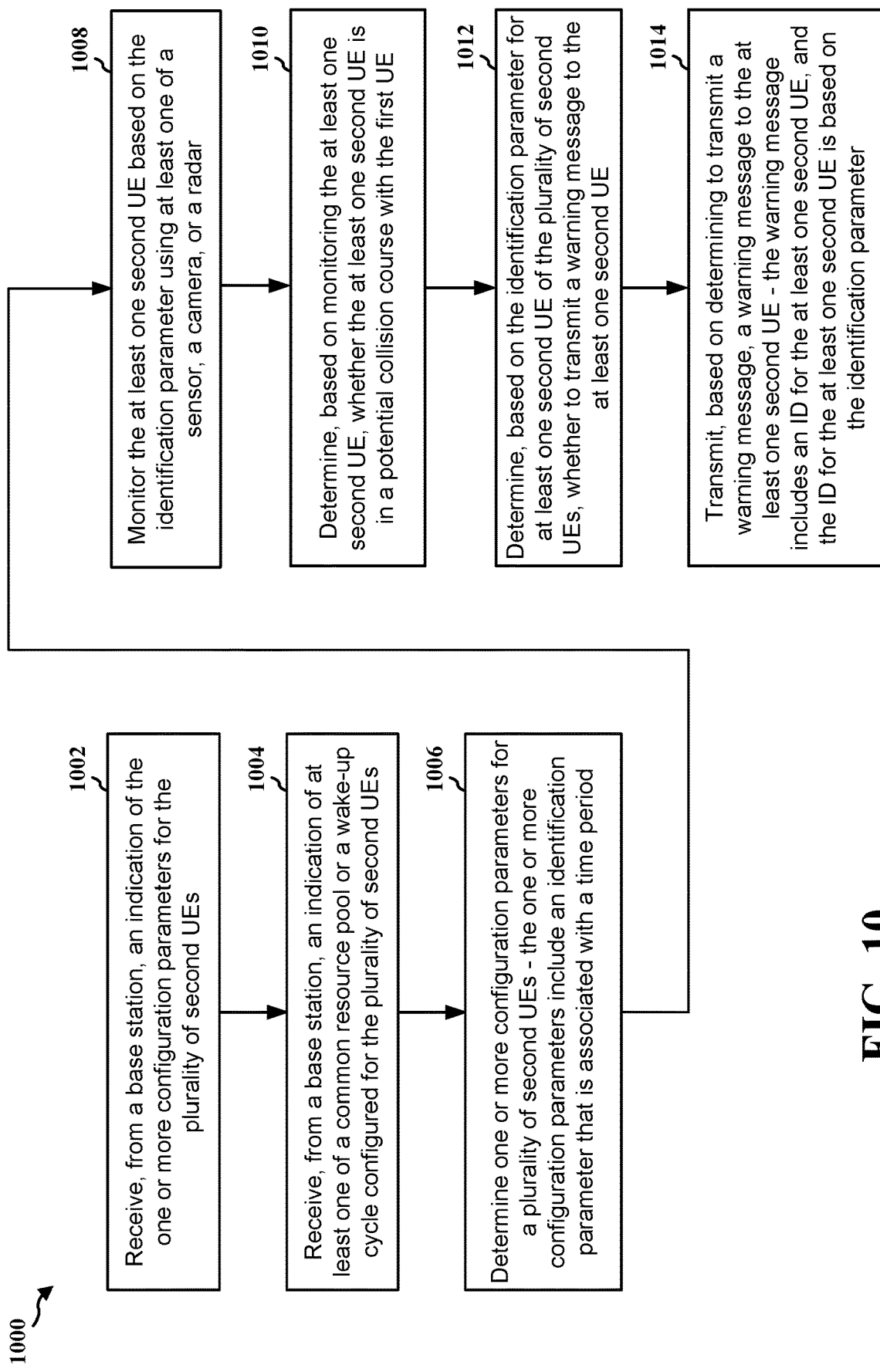
FIG. 10 is a flowchart of a method of wireless communication in accordance with aspects presented herein.

FIG. 10 is a flowchart 1000 of a method of wireless communication. The method may be performed by a UE or a component of a UE (e.g., the UE 104, 350, 402, 404, 406, 408, 802; the apparatus 1102; a processing system, which may include the memory 360 and which may be the entire UE 350 or a component of the UE 350, such as the TX processor 368, the RX processor 356, and/or the controller/processor 359). The method may enable a first UE, such as a vehicle UE, to monitor and identify one or more pedestrians based on their movements and to transmit a warning message to their UEs (e.g., pedestrian UEs) if the pedestrians are in a collision course or a potential collision course with the vehicle carrying the first UE.

At 1002, a first UE may receive, from a base station, an indication of the one or more configuration parameters for the plurality of second UEs, such as described in connection with FIG. 8. For example, at 814, the vehicle UE 802 may receive, from the base station 806, an indication 816 of the one or more configuration parameters for a plurality pedestrian UEs, which may include the pedestrian UE 804. The reception of the indication of the one or more configuration parameters may be performed by, e.g., the configuration parameter process component 1140 and/or the reception component 1130 of the apparatus 1102 in FIG. 11.

In one example, the first UE may transmit, to the plurality of second UEs via a broadcast message, an indication of the one or more configuration parameters including the identification parameter, such as described in connection with 815 of FIG. 8.

At 1004, the first UE may receive, from a base station, an indication of at least one of a common resource pool or a wake-up cycle configured for the plurality of second UEs, such as described in connection with FIG. 8. For example, at 822, the vehicle UE 802 may receive, from the base station 806, an indication 824 of at least one of a common resource pool or a wake-up cycle (e.g., the configuration 820) configured for the one or more pedestrian UEs. The reception of the indication of at least one of a common resource pool or a wake-up cycle may be performed by, e.g., the resource and cycle process component 1142 and/or the reception component 1130 of the apparatus 1102 in FIG. 11.

At 1006, the first UE may determine one or more configuration parameters for a plurality of second UEs, the one or more configuration parameters including an identification parameter, the identification parameter being associated with a time period, such as described in connection with FIG. 8. For example, at 826, the vehicle UE 802 may determine one or more configuration parameters for one or more pedestrian UEs based on the indication 816, where the one or more configuration parameters may include an identification parameter 810 that is associated with a time period 812. The determination of the one or more configuration parameters for the plurality of second UEs may be performed by, e.g., the configuration parameter determination component 1144 of the apparatus 1102 in FIG. 11.

At 1008, the first UE may monitor the at least one second UE based on the identification parameter using at least one of a sensor, a camera, or a radar, such as described in connection with FIG. 8. For example, at 828, the vehicle UE 802 may monitor one or more pedestrian UEs (e.g., their user) based on the identification parameter 810 using at least one of a sensor, a camera, or a radar. The monitoring of the at least one second UE based on the identification parameter may be performed by, e.g., the pedestrian monitoring component 1146 of the apparatus 1102 in FIG. 11.

At 1010, the first UE may determine, based on monitoring the at least one second UE, whether the at least one second UE is in a potential collision course with the first UE, such as described in connection with FIG. 8. For example, at 830, the vehicle UE 802 may determine, based on monitoring the one or more pedestrian UEs, whether the pedestrian UE 804 (e.g., its user) is in a potential collision course with the vehicle UE 802. The monitoring of the at least one second UE based on the identification parameter may be performed by, e.g., the pedestrian monitoring component 1146 and/or the collision course determination component 1148 of the apparatus 1102 in FIG. 11. The first UE may determine to transmit the warning message to the at least one second UE based on determining that the at least one second UE is in the potential collision course with the first UE.

At 1012, the first UE may determine, based on the identification parameter for at least one second UE of the plurality of second UEs, whether to transmit a warning message to the at least one second UE, such as described in connection with FIG. 8. For example, at 830, the vehicle UE 802 may determine whether to transmit a warning message 832 to the pedestrian UE 804 based on the identification parameter of the pedestrian UE 804. The determination of whether to transmit a warning message may be performed by, e.g., the warning message determination component 1150 of the apparatus 1102 in FIG. 11.

At 1014, the first UE may transmit, based on determining to transmit the warning message, the warning message to the at least one second UE, the warning message including an ID for the at least one second UE, the ID for the at least one second UE being based on the identification parameter, such as described in connection with FIG. 8. For example, at 834, the vehicle UE 802 may transmit a warning message 834 to the pedestrian UE 804, where the warning message may include an ID for the pedestrian UE 804. The transmission of the warning message may be performed by, e.g., the warning message process component 1152 and/or the transmission component 1134 of the apparatus 1102 in FIG. 11. The warning message may be transmitted to the at least one second UE via a broadcast message.

In one example, the first UE may transmit the warning message to the at least one second UE based on the at least one of the common resource pool or the wake-up cycle configured for the plurality of second UEs.

In another example, the identification parameter may include one or more measurements for at least one of velocity, acceleration, direction, location, movement, or trajectory associated with the plurality of second UEs over the time period. In such an example, the first UE may quantize the one or more measurements for at least one of velocity, acceleration, direction, location, movement, or trajectory associated with the plurality of second UEs over the time period into multiple levels, where each of the multiple levels may include a range for the one or more measurements.

In another example, the ID for the at least one second UE may be based on the one or more measurements for the at least one second UE over the time period. In such an example, the ID for the at least one second UE may change dynamically over time.

Figure 11:
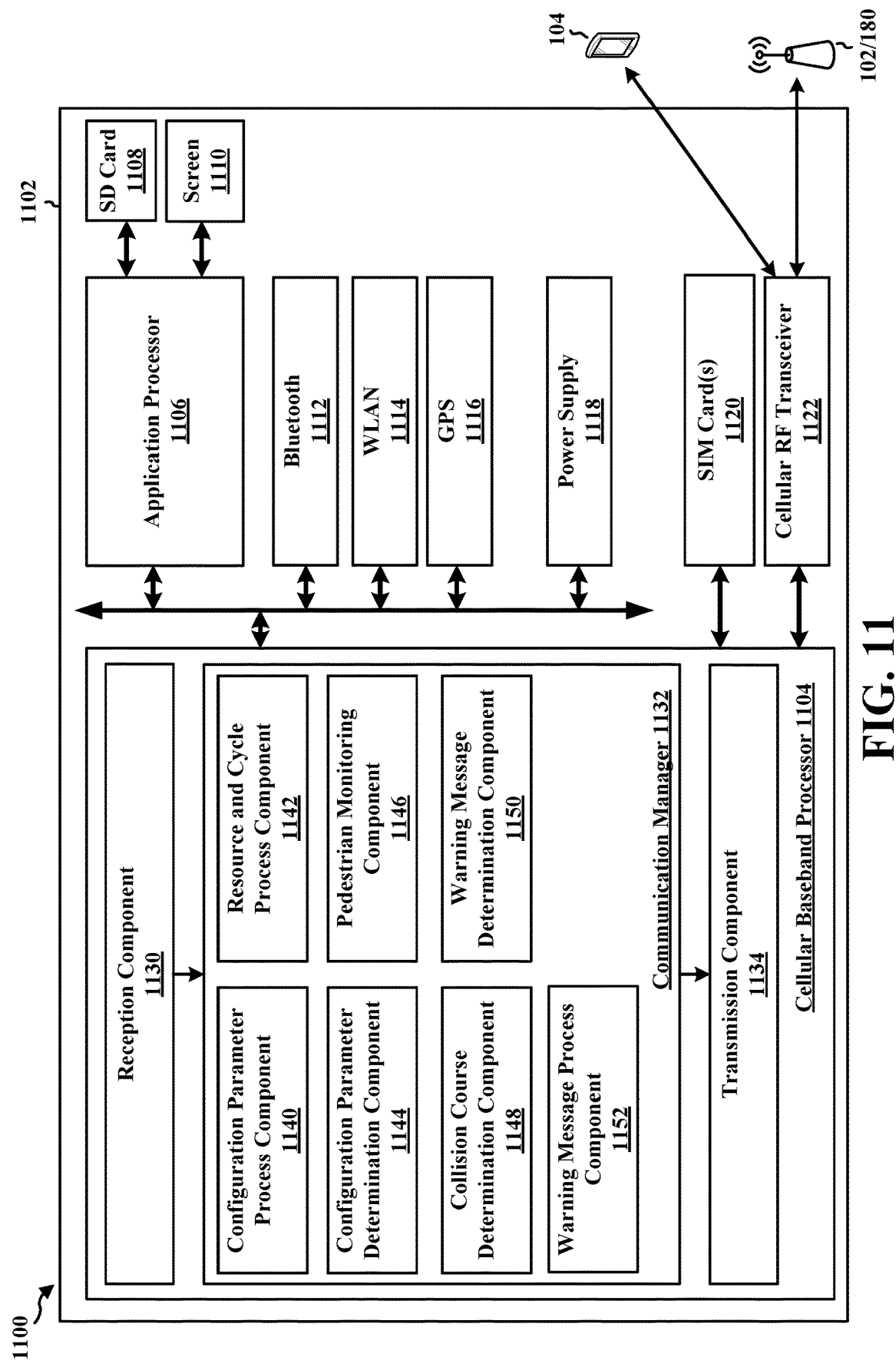
FIG. 11 is a diagram illustrating an example of a hardware implementation for an example apparatus in accordance with aspects presented herein.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a configuration parameter process component 1140 that is configured to receive, from a base station, an indication of the one or more configuration parameters for the plurality of second UEs, e.g., as described in connection with 1002 of FIG. 10. The communication manager 1132 further includes a resource and cycle process component 1142 that is configured to receive, from a base station, an indication of at least one of a common resource pool or a wake-up cycle configured for the plurality of second UEs, e.g., as described in connection with 1004 of FIG. 10. The communication manager 1132 further includes a configuration parameter determination component 1144 that is configured to determine one or more configuration parameters for a plurality of second UEs, the one or more configuration parameters including an identification parameter, the identification parameter being associated with a time period, e.g., as described in connection with 906 of FIG. 9 and/or 1006 of FIG. 10. The communication manager 1132 further includes a pedestrian monitoring component 1146 that is configured to monitor the at least one second UE based on the identification parameter using at least one of a sensor, a camera, or a radar, e.g., as described in connection with 1008 of FIG. 10. The communication manager 1132 further includes a collision course determination component 1148 that is configured to determine, based on monitoring the at least one second UE, whether the at least one second UE is in a potential collision course with the first UE, e.g., as described in connection with 1010 of FIG. 10. The communication manager 1132 further includes a warning message determination component 1150 that is configured to determine, based on the identification parameter for at least one second UE of the plurality of second UEs, whether to transmit a warning message to the at least one second UE, e.g., as described in connection with 912 of FIG. 9 and/or 1012 of FIG. 10. The communication manager 1132 further includes a warning message process component 1152 that is configured to transmit, based on determining to transmit the warning message, the warning message to the at least one second UE, the warning message including an ID for the at least one second UE, the ID for the at least one second UE being based on the identification parameter, e.g., as described in connection with 914 of FIG. 9 and/or 1014 of FIG. 10.

The apparatus may include additional components that perform each of the blocks of the algorithm in the flowcharts of FIGS. 9 and 10. As such, each block in the flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving, from a base station, an indication of the one or more configuration parameters for the plurality of second UEs (e.g., the configuration parameter process component 1140 and/or the reception component 1130). The apparatus 1102 includes means for receiving, from a base station, an indication of at least one of a common resource pool or a wake-up cycle configured for the plurality of second UEs (e.g., the resource and cycle process component 1142 and/or the reception component 1130). The apparatus 1102 includes means for determining one or more configuration parameters for a plurality of second UEs, the one or more configuration parameters including an identification parameter, the identification parameter being associated with a time period (e.g., the configuration parameter determination component 1144). The apparatus 1102 includes means for monitoring the at least one second UE based on the identification parameter using at least one of a sensor, a camera, or a radar (e.g., the pedestrian monitoring component 1146). The apparatus 1102 includes means for determining, based on monitoring the at least one second UE, whether the at least one second UE is in a potential collision course with the first UE (e.g., the pedestrian monitoring component 1146 and/or the collision course determination component 1148). The apparatus 1102 includes means for determining, based on the identification parameter for at least one second UE of the plurality of second UEs, whether to transmit a warning message to the at least one second UE (e.g., the warning message determination component 1150). The apparatus 1102 includes means for transmitting, based on determining to transmit the warning message, the warning message to the at least one second UE, the warning message including an ID for the at least one second UE, the ID for the at least one second UE being based on the identification parameter (e.g., the warning message process component 1152 and/or the transmission component 1134).

In one configuration, the first UE may transmit the warning message to the at least one second UE based on the at least one of the common resource pool or the wake-up cycle configured for the plurality of second UEs.

In another configuration, the identification parameter may include one or more measurements for at least one of velocity, acceleration, direction, location, movement, or trajectory associated with the plurality of second UEs over the time period. In such a configuration, the first UE may quantize the one or more measurements for at least one of velocity, acceleration, direction, location, movement, or trajectory associated with the plurality of second UEs over the time period into multiple levels, where each of the multiple levels may include a range for the one or more measurements.

In another configuration, the ID for the at least one second UE may be based on the one or more measurements for the at least one second UE over the time period. In such a configuration, the ID for the at least one second UE may change dynamically over time.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
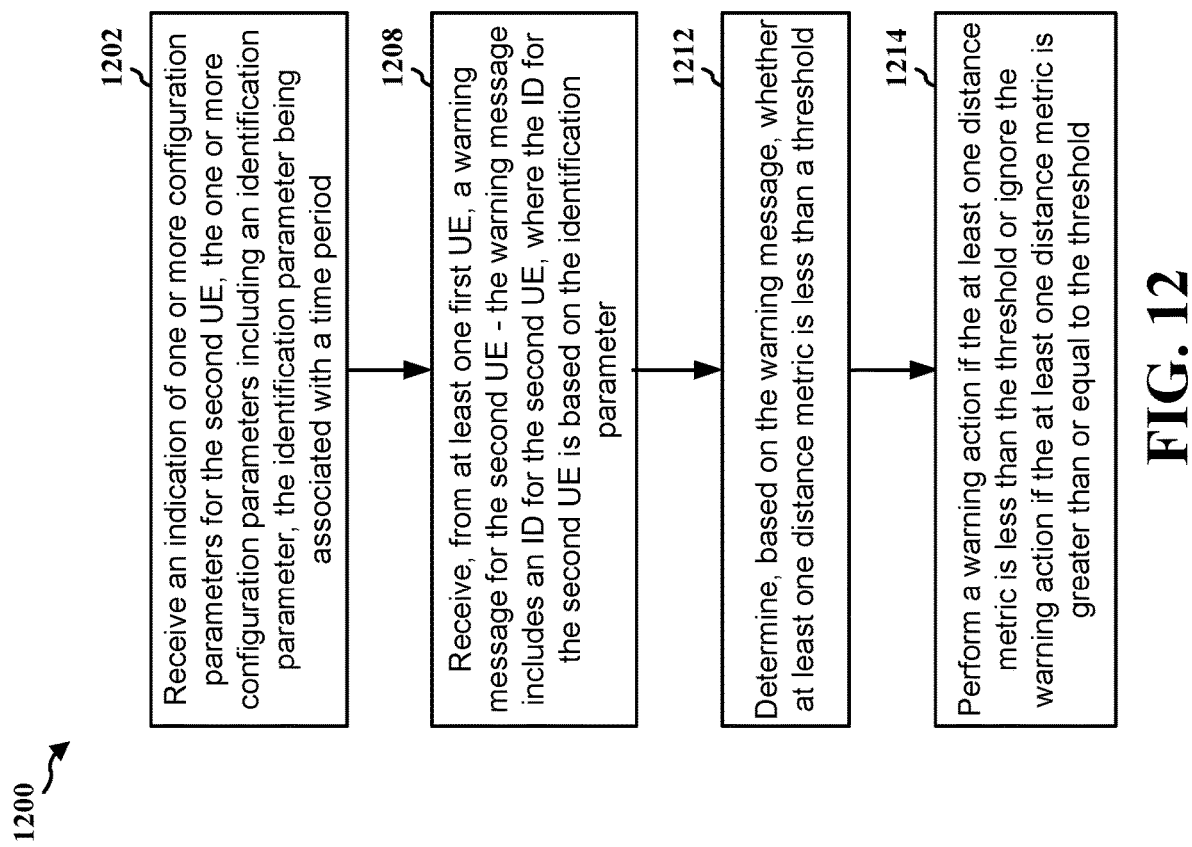
FIG. 12 is a flowchart of a method of wireless communication in accordance with aspects presented herein.

FIG. 12 is a flowchart 1200 of a method of wireless communication. The method may be performed by a UE or a component of a UE (e.g., the UE 104, 350, 402, 404, 406, 408, 804; the apparatus 1402; a processing system, which may include the memory 360 and which may be the entire UE 350 or a component of the UE 350, such as the TX processor 368, the RX processor 356, and/or the controller/processor 359). The method may enable a second UE, such as a pedestrian UE, to monitor for warning message(s) from one or more vehicle UEs and to perform warning actions if the second UE determines that the warning message is directed to the second UE and optionally the distance between the second UE and the vehicle UE transmitting the warning message is below a threshold.

At 1202, a second UE may receive an indication of one or more configuration parameters for the second UE, the one or more configuration parameters may include an identification parameter that is associated with a time period, such as described in connection with FIG. 8. For example, at 814, the pedestrian UE 804 may receive, from the base station 806, an indication 816 of the one or more configuration parameters for a plurality pedestrian UEs, which may include the pedestrian UE 804. The reception of the indication of the one or more configuration parameters may be performed by, e.g., the configuration parameter process component 1440 and/or the reception component 1430 of the apparatus 1402 in FIG. 14. The one or more configuration parameters may be received from a base station or the at least one first UE via a broadcast message.

In one example, the second UE may receive, from a base station, a configuration for at least one of a common resource pool or a wake-up cycle for the second UE, such as described in connection with FIG. 8. For example, at 818, the pedestrian UE 804 may receive, from the base station 806, a configuration 820 for at least one of a common resource pool or a wake-up cycle for the one or more pedestrian UEs. The reception of the configuration may be performed by, e.g., the resource and cycle process component 1442 and/or the reception component 1430 of the apparatus 1402 in FIG. 14.

In one example, the one or more configuration parameters may be received from a base station, and where the configuration may be included in the one or more configuration parameters.

In one example, the second UE may monitor for the warning message from the at least one first UE based on the at least one of the common resource pool or the wake-up cycle for the second UE, where the second UE may receive the warning message based on the monitoring, such as described in connection with FIG. 8. For example, at 818, after the one or more pedestrian UEs are configured with the common resource pool and/or the wake-up cycle, the one or more pedestrian UEs may monitor for warning message(s) from one or more vehicle UEs based on the common resource pool and/or the wake-up cycle for the pedestrian UEs, where the one or more pedestrian UEs may receive the warning message(s) based on the monitoring. The monitoring of the warning message may be performed by, e.g., the warning message monitor component 1444 of the apparatus 1402 in FIG. 14.

At 1208, the second UE may receive, from at least one first UE, a warning message for the second UE, where the warning message may include an ID for the second UE, and the ID for the second UE may be based on the identification parameter, such as described in connection with FIG. 8. For example, at 834, the pedestrian UE 804 may receive, from the vehicle UE 802, a warning message 832, where the warning message may include an ID for the pedestrian UE 804. The reception of the warning message may be performed by, e.g., the warning message process component 1446 and/or the reception component 1430 of the apparatus 1402 in FIG. 14. The warning message may be received from the at least one first UE via a broadcast message.

In one example, the second UE may generate a key identifying the second UE based on the one or more measurements over the time period, and determine the warning message is directed to the second UE based on the ID in the warning message matching the key, such as described in connection with FIG. 8. For example, at 836, the pedestrian UE 804 may generate a key identifying the pedestrian UE 804 based on one or more movement measurements of the pedestrian UE 804 over the time period 812. At 838, the pedestrian UE 804 may determine whether the warning message 832 is directed to the pedestrian UE 804 based on the ID in the warning message matching the key. The generation of the key may be performed by, e.g., the key generation component 1448 of the apparatus 1402 in FIG. 14. In such an example, the ID for the at least one second UE may change dynamically over time.

At 1212, the second UE may determine, based on the warning message, whether at least one distance metric is less than a threshold, such as described in connection with FIG. 8. For example, at 838, the pedestrian UE 804 may determine, based on the warning message 834, whether at least one distance metric is less than a threshold. The determination of whether at least one distance metric is less than a threshold may be performed by, e.g., the distance metric component 1450 of the apparatus 1402 in FIG. 14.

At 1214, the second UE may perform a warning action if the at least one distance metric is less than the threshold or may ignore the warning action if the at least one distance metric is greater than or equal to the threshold, such as described in connection with FIG. 8. For example, at 840, the pedestrian UE 804 may perform a warning action if the at least one distance metric is less than the threshold or may ignore the warning action if the at least one distance metric is greater than or equal to the threshold. The warning action may be performed by, e.g., the warning action component 1452 of the apparatus 1402 in FIG. 14.

In another example, the identification parameter may include one or more measurements for at least one of velocity, acceleration, direction, location, movement, or trajectory associated with the plurality of second UEs over the time period. In such an example, the second UE may quantize the one or more measurements for at least one of velocity, acceleration, direction, location, movement, or trajectory associated with the plurality of second UEs over the time period into multiple levels, where each of the multiple levels may include a range for the one or more measurements.

Figure 13:
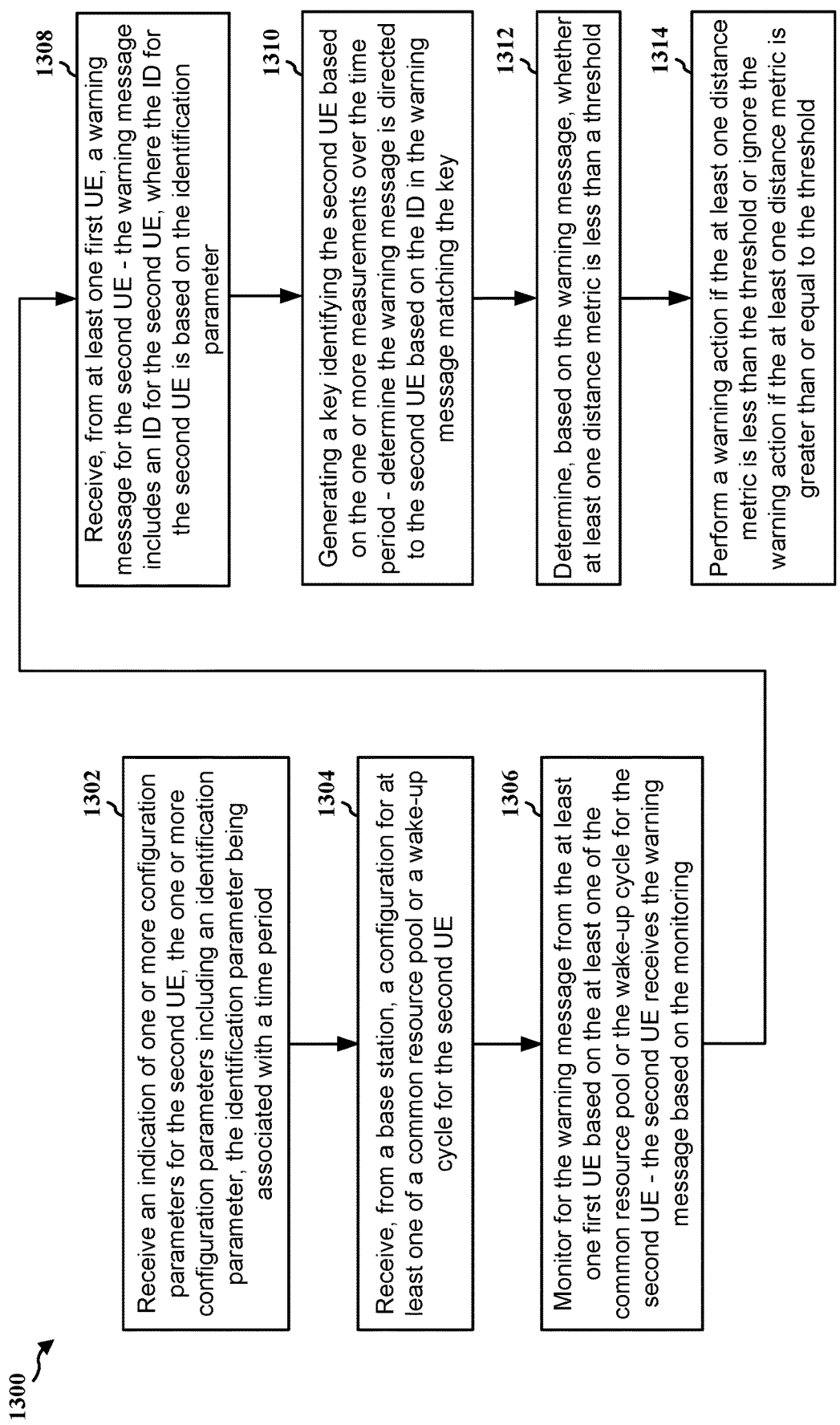
FIG. 13 is a flowchart of a method of wireless communication in accordance with aspects presented herein.

FIG. 13 is a flowchart 1300 of a method of wireless communication. The method may be performed by a UE or a component of a UE (e.g., the UE 104, 350, 402, 404, 406, 408, 804; the apparatus 1402; a processing system, which may include the memory 360 and which may be the entire UE 350 or a component of the UE 350, such as the TX processor 368, the RX processor 356, and/or the controller/processor 359). The method may enable a second UE, such as a pedestrian UE, to monitor for warning message(s) from one or more vehicle UEs and to perform warning actions if the second UE determines that the warning message is directed to the second UE and optionally the distance between the second UE and the vehicle UE transmitting the warning message is below a threshold.

At 1302, a second UE may receive an indication of one or more configuration parameters for the second UE, the one or more configuration parameters may include an identification parameter that is associated with a time period, such as described in connection with FIG. 8. For example, at 814, the pedestrian UE 804 may receive, from the base station 806, an indication 816 of the one or more configuration parameters for a plurality pedestrian UEs, which may include the pedestrian UE 804. The reception of the indication of the one or more configuration parameters may be performed by, e.g., the configuration parameter process component 1440 and/or the reception component 1430 of the apparatus 1402 in FIG. 14. The one or more configuration parameters may be received from a base station or the at least one first UE via a broadcast message.

At 1304, the second UE may receive, from a base station, a configuration for at least one of a common resource pool or a wake-up cycle for the second UE, such as described in connection with FIG. 8. For example, at 818, the pedestrian UE 804 may receive, from the base station 806, a configuration 820 for at least one of a common resource pool or a wake-up cycle for the one or more pedestrian UEs. The reception of the configuration may be performed by, e.g., the resource and cycle process component 1442 and/or the reception component 1430 of the apparatus 1402 in FIG. 14.

In one example, the one or more configuration parameters may be received from a base station, and where the configuration may be included in the one or more configuration parameters.

At 1306, the second UE may monitor for the warning message from the at least one first UE based on the at least one of the common resource pool or the wake-up cycle for the second UE, where the second UE may receive the warning message based on the monitoring, such as described in connection with FIG. 8. For example, at 818, after the one or more pedestrian UEs are configured with the common resource pool and/or the wake-up cycle, the one or more pedestrian UEs may monitor for warning message(s) from one or more vehicle UEs based on the common resource pool and/or the wake-up cycle for the pedestrian UEs, where the one or more pedestrian UEs may receive the warning message(s) based on the monitoring. The monitoring of the warning message may be performed by, e.g., the warning message monitor component 1444 of the apparatus 1402 in FIG. 14.

At 1308, the second UE may receive, from at least one first UE, a warning message for the second UE, where the warning message may include an ID for the second UE, and the ID for the second UE may be based on the identification parameter, such as described in connection with FIG. 8. For example, at 834, the pedestrian UE 804 may receive, from the vehicle UE 802, a warning message 832, where the warning message may include an ID for the pedestrian UE 804. The reception of the warning message may be performed by, e.g., the warning message process component 1446 and/or the reception component 1430 of the apparatus 1402 in FIG. 14. The warning message may be received from the at least one first UE via a broadcast message.

At 1310, the second UE may generate a key identifying the second UE based on the one or more measurements over the time period, and determine the warning message is directed to the second UE based on the ID in the warning message matching the key, such as described in connection with FIG. 8. For example, at 836, the pedestrian UE 804 may generate a key identifying the pedestrian UE 804 based on one or more movement measurements of the pedestrian UE 804 over the time period 812. At 838, the pedestrian UE 804 may determine whether the warning message 832 is directed to the pedestrian UE 804 based on the ID in the warning message matching the key. The generation of the key may be performed by, e.g., the key generation component 1448 of the apparatus 1402 in FIG. 14. In such an example, the ID for the at least one second UE may change dynamically over time.

At 1312, the second UE may determine, based on the warning message, whether at least one distance metric is less than a threshold, such as described in connection with FIG. 8. For example, at 838, the pedestrian UE 804 may determine, based on the warning message 834, whether at least one distance metric is less than a threshold. The determination of whether at least one distance metric is less than a threshold may be performed by, e.g., the distance metric component 1450 of the apparatus 1402 in FIG. 14.

At 1314, the second UE may perform a warning action if the at least one distance metric is less than the threshold or may ignore the warning action if the at least one distance metric is greater than or equal to the threshold, such as described in connection with FIG. 8. For example, at 840, the pedestrian UE 804 may perform a warning action if the at least one distance metric is less than the threshold or may ignore the warning action if the at least one distance metric is greater than or equal to the threshold. The warning action may be performed by, e.g., the warning action component 1452 of the apparatus 1402 in FIG. 14.

In another example, the identification parameter may include one or more measurements for at least one of velocity, acceleration, direction, location, movement, or trajectory associated with the plurality of second UEs over the time period. In such an example, the second UE may quantize the one or more measurements for at least one of velocity, acceleration, direction, location, movement, or trajectory associated with the plurality of second UEs over the time period into multiple levels, where each of the multiple levels may include a range for the one or more measurements.

Figure 14:
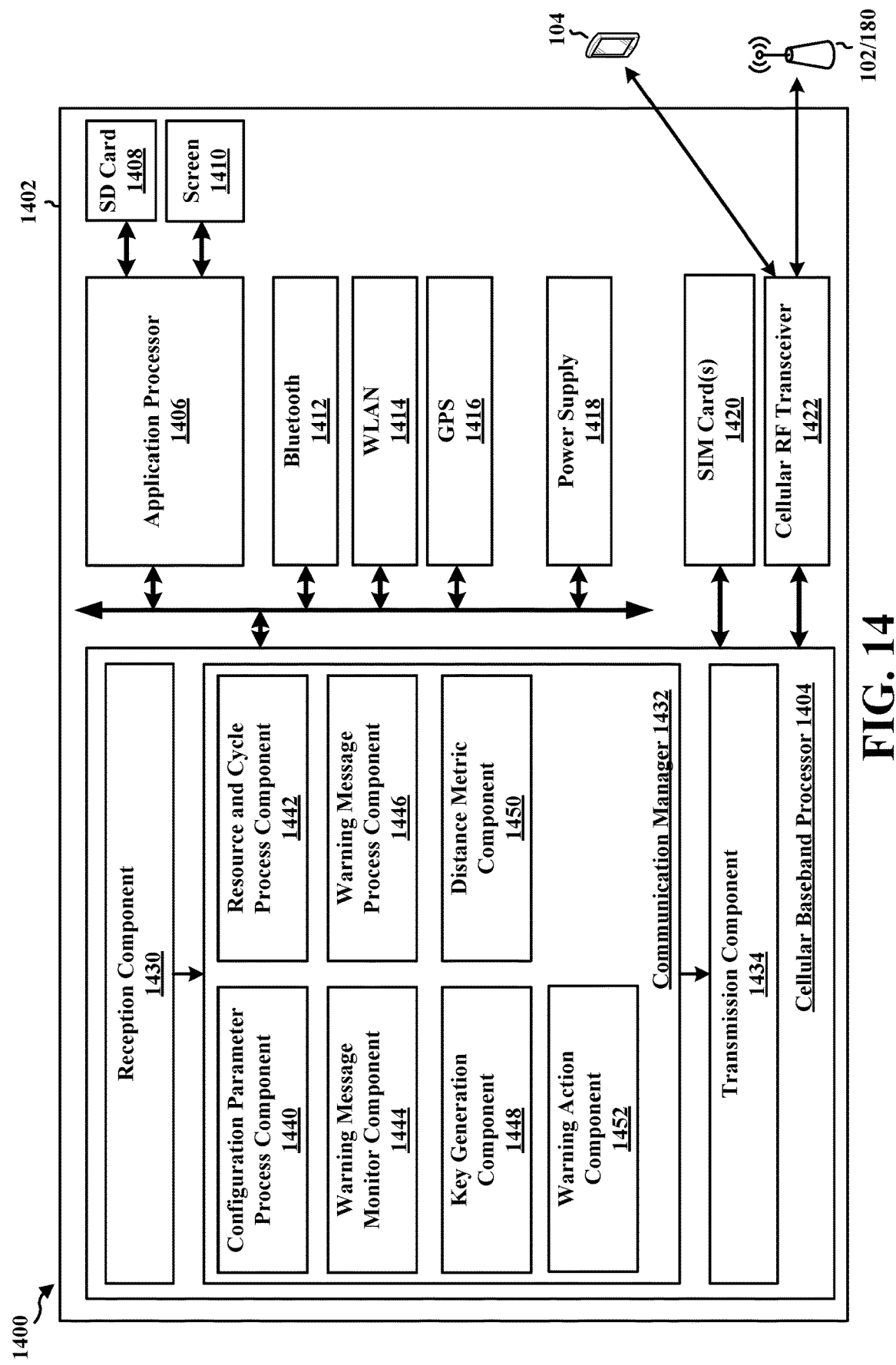
FIG. 14 is a diagram illustrating an example of a hardware implementation for an example apparatus in accordance with aspects presented herein.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a configuration parameter process component 1440 that is configured to receive an indication of one or more configuration parameters for the second UE, the one or more configuration parameters may include an identification parameter that is associated with a time period, e.g., as described in connection with 1202 of FIG. 12 and/or 1302 of FIG. 13. The communication manager 1432 further includes a resource and cycle process component 1442 that is configured to receive, from a base station, a configuration for at least one of a common resource pool or a wake-up cycle for the second UE, e.g., as described in connection with 1304 of FIG. 13. The communication manager 1432 further includes a warning message monitor component 1444 that is configured to monitor for the warning message from the at least one first UE based on the at least one of the common resource pool or the wake-up cycle for the second UE, where the second UE may receive the warning message based on the monitoring, e.g., as described in connection with 1306 of FIG. 13. The communication manager 1432 further includes a warning message process component 1446 that is configured to receive, from at least one first UE, a warning message for the second UE, where the warning message may include an ID for the second UE, and the ID for the second UE may be based on the identification parameter, e.g., as described in connection with 1208 of FIG. 12 and/or 1308 of FIG. 13. The communication manager 1432 further includes a key generation component 1448 that is configured to generate a key identifying the second UE based on the one or more measurements over the time period, and determine the warning message is directed to the second UE based on the ID in the warning message matching the key, e.g., as described in connection with 1310 of FIG. 13. The communication manager 1432 further includes a distance metric component 1450 that is configured to determine, based on the warning message, whether at least one distance metric is less than a threshold, e.g., as described in connection with 1212 of FIG. 12 and/or 1312 of FIG. 13. The communication manager 1432 further includes a warning action component 1452 that is configured to perform a warning action if the at least one distance metric is less than the threshold or ignore the warning action if the at least one distance metric is greater than or equal to the threshold, e.g., as described in connection with 1214 of FIG. 12 and/or 1314 of FIG. 13.

The apparatus may include additional components that perform each of the blocks of the algorithm in the flowcharts of FIGS. 12 and 13. As such, each block in the flowcharts of FIGS. 12 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving an indication of one or more configuration parameters for the second UE, the one or more configuration parameters may include an identification parameter that is associated with a time period (e.g., the configuration parameter process component 1440 and/or the reception component 1430). The apparatus 1402 includes means for receiving, from a base station, a configuration for at least one of a common resource pool or a wake-up cycle for the second UE (e.g., the resource and cycle process component 1442 and/or the reception component 1430). The apparatus 1402 includes means for monitoring for the warning message from the at least one first UE based on the at least one of the common resource pool or the wake-up cycle for the second UE, where the second UE may receive the warning message based on the monitoring (e.g., the warning message monitor component 1444). The apparatus 1402 includes means for receiving, from at least one first UE, a warning message for the second UE, where the warning message may include an ID for the second UE, and the ID for the second UE may be based on the identification parameter (e.g., the warning message process component 1446 and/or the reception component 1430). The apparatus 1402 include s means for generating a key identifying the second UE based on the one or more measurements over the time period, and means for determining the warning message is directed to the second UE based on the ID in the warning message matching the key (e.g., the key generation component 1448). The apparatus 1402 includes means for determining, based on the warning message, whether at least one distance metric is less than a threshold (e.g., distance metric component 1450). The apparatus 1402 includes means for performing a warning action if the at least one distance metric is less than the threshold or may ignore the warning action if the at least one distance metric is greater than or equal to the threshold (e.g., the warning action component 1452). The one or more configuration parameters may be received from a base station, and where the configuration may be included in the one or more configuration parameters. The ID for the at least one second UE may change dynamically over time.

In one configuration, the identification parameter may include one or more measurements for at least one of velocity, acceleration, direction, location, movement, or trajectory associated with the plurality of second UEs over the time period. In such a configuration, the second UE may quantize the one or more measurements for at least one of velocity, acceleration, direction, location, movement, or trajectory associated with the plurality of second UEs over the time period into multiple levels, where each of the multiple levels may include a range for the one or more measurements.

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
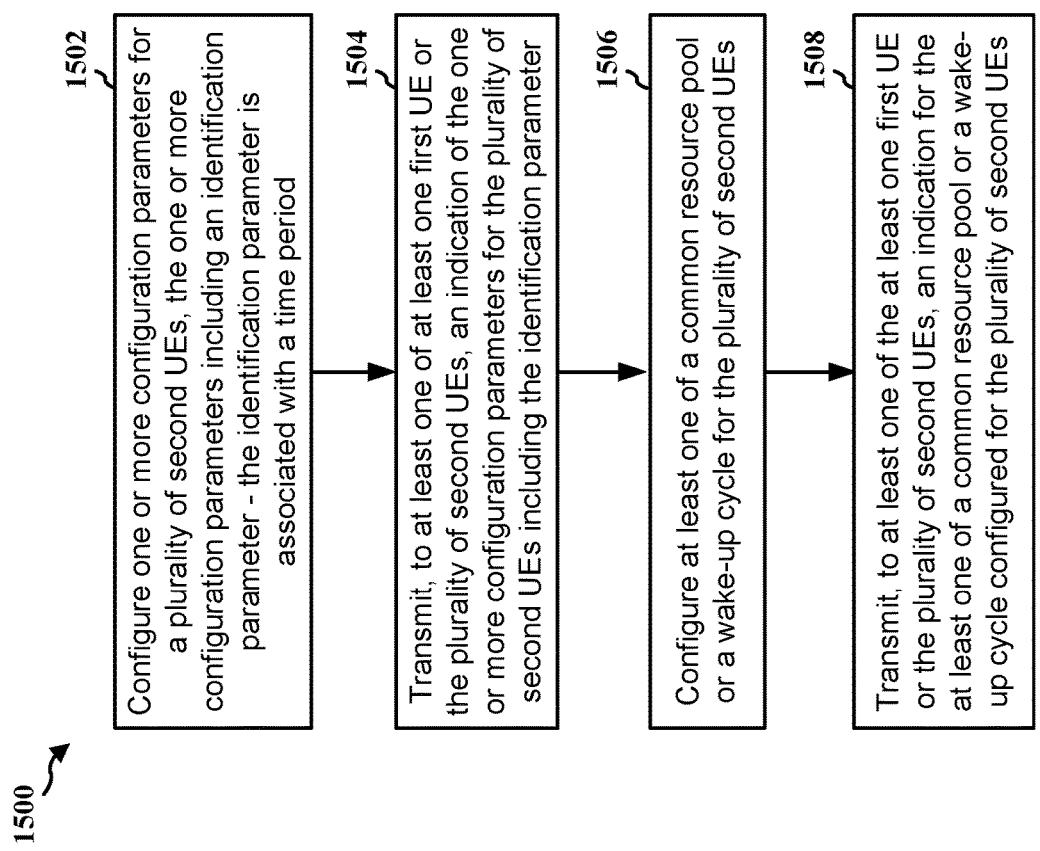
FIG. 15 is a flowchart of a method of wireless communication in accordance with aspects presented herein.

FIG. 15 is a flowchart 1500 of a method of wireless communication. The method may be performed by a base station or a component of a base station (e.g., the base station 102, 180, 310, 806; the apparatus 1602; a processing system, which may include the memory 376 and which may be the entire base station 310 or a component of the base station 310, such as the TX processor 316 the RX processor 370, and/or the controller/processor 375). The method may enable the base station to configure an identifier mechanism to one or more vehicle UEs and one or more pedestrian UEs, such as based on location, velocity, and/or acceleration measurements over the last n time instants and/or time windows.

At 1502, the base station may configure one or more configuration parameters for a plurality of second UEs, the one or more configuration parameters may include an identification parameter, and the identification parameter may be associated with a time period, such as described in connection with FIG. 8. For example, at 808, the base station 806 may configure one or more configuration parameters for one or more pedestrian UEs, where the one or more configuration parameters may include an identification parameter 810 that may be associated with a time period 812. The configuration of the one or more configuration parameters may be performed by, e.g., the configuration parameter process component 1640 and/or the transmission component 1634 of the apparatus 1602 in FIG. 16.

At 1504, the base station may transmit, to at least one of at least one first UE or the plurality of second UEs, an indication of the one or more configuration parameters for the plurality of second UEs including the identification parameter, such as described in connection with FIG. 8. For example, at 814, the base station 806 may transmit, to one or more vehicle UEs and one or more pedestrian UEs, an indication 816 of the one or more configuration parameters for the one or more pedestrian UEs that includes the identification parameter 810. The transmission of the indication may be performed by, e.g., the configuration parameter indication component 1642 and/or the transmission component 1634 of the apparatus 1602 in FIG. 16.

In one example, the one or more configuration parameters may be transmitted to the plurality of second UEs via a broadcast message.

In another example, the identification parameter may include one or more measurements for at least one of velocity, acceleration, direction, location, movement, or trajectory associated with the plurality of second UEs over the time period.

At 1506, the base station may configure at least one of a common resource pool or a wake-up cycle for the plurality of second UEs, such as described in connection with FIG. 8. For example, at 818, the base station 806 may configure a common resource pool and/or a wake-up cycle for one or more pedestrian UEs, such as via the configuration 820. The configuration of the common resource pool or the wake-up cycle may be performed by, e.g., the resource and cycle configuration component 1644 and/or the transmission component 1634 of the apparatus 1602 in FIG. 16.

At 1508, the base station may transmit, to at least one of the at least one first UE or the plurality of second UEs, an indication for the at least one of a common resource pool or a wake-up cycle configured for the plurality of second UEs, such as described in connection with FIG. 8. For example, at 818 and 822, the base station 806 may transmit, to at least one of the vehicle UEs or pedestrian UEs, an indication 824 for the common resource pool and/or the wake-up cycle configured for the pedestrian UEs. The transmission of the indication may be performed by, e.g., the resource and cycle indication component 1646 and/or the transmission component 1634 of the apparatus 1602 in FIG. 16.

In one example, the indication may be transmitted to the at least one first UE or the plurality of second UEs via a broadcast message.

Figure 16:
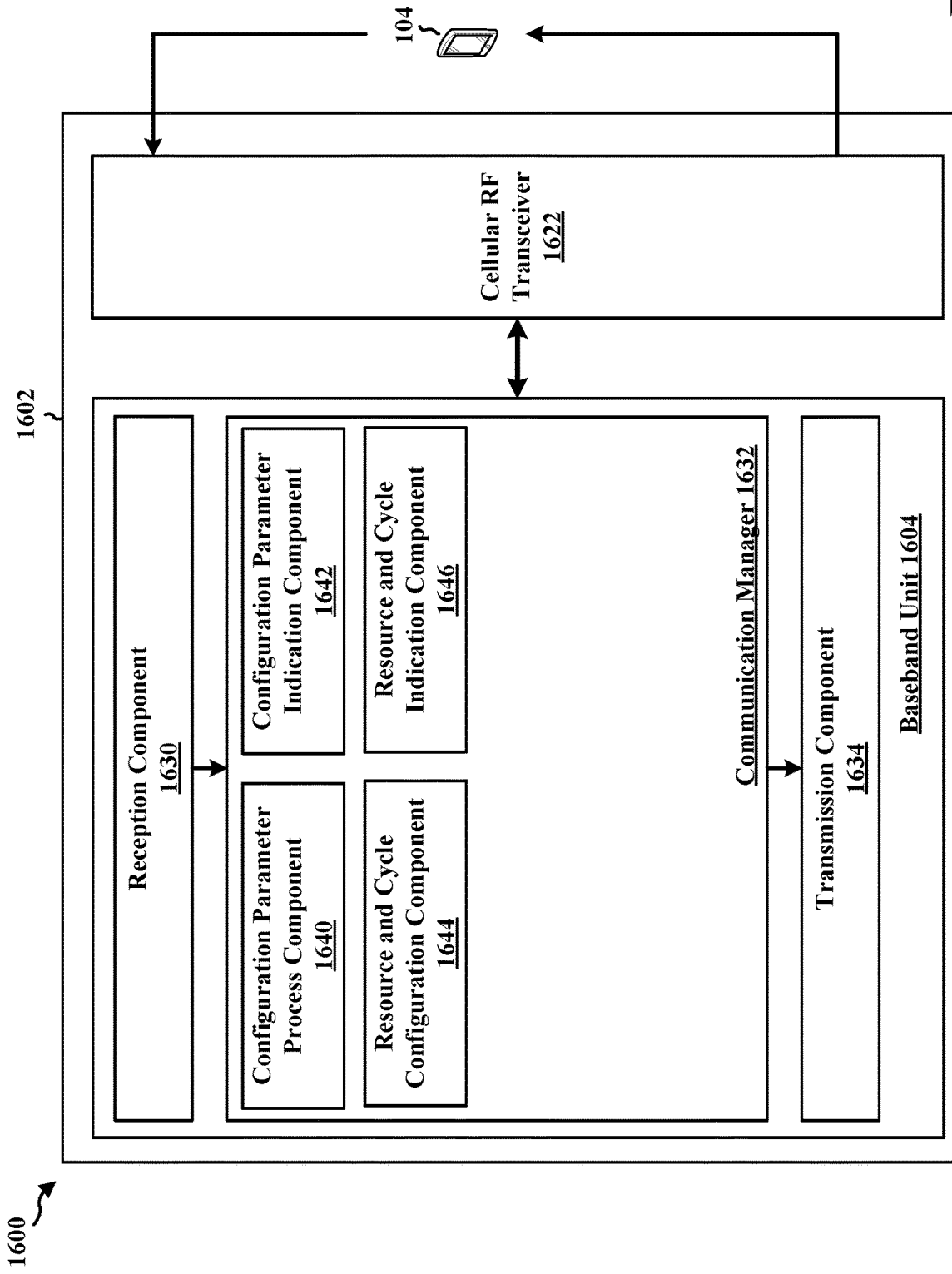
FIG. 16 is a diagram illustrating an example of a hardware implementation for an example apparatus in accordance with aspects presented herein.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a configuration parameter process component 1640 that configures one or more configuration parameters for a plurality of second UEs, the one or more configuration parameters may include an identification parameter, and the identification parameter may be associated with a time period, e.g., as described in connection with 1502 of FIG. 15. The communication manager 1632 further includes a configuration parameter indication component 1642 that transmits, to at least one of at least one first UE or the plurality of second UEs, an indication of the one or more configuration parameters for the plurality of second UEs including the identification parameter, e.g., as described in connection with 1504 of FIG. 15. The communication manager 1632 includes a resource and cycle configuration component 1644 that configures at least one of a common resource pool or a wake-up cycle for the plurality of second UEs, e.g., as described in connection with 1506 of FIG. 15. The communication manager 1632 further includes a resource and cycle indication component 1646 that transmits, to at least one of the at least one first UE or the plurality of second UEs, an indication for the at least one of a common resource pool or a wake-up cycle configured for the plurality of second UEs, e.g., as described in connection with 1508 of FIG. 15.

The apparatus may include additional components that perform each of the blocks of the algorithm in the flowchart of FIG. 15. As such, each block in the flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for configuring one or more configuration parameters for a plurality of second UEs, the one or more configuration parameters may include an identification parameter, and the identification parameter may be associated with a time period (e.g., the configuration parameter process component 1640 and/or the transmission component 1634). The apparatus 1502 includes means for transmitting, to at least one of at least one first UE or the plurality of second UEs, an indication of the one or more configuration parameters for the plurality of second UEs including the identification parameter (e.g., the configuration parameter indication component 1642 and/or the transmission component 1634). The apparatus 1502 includes means for configuring at least one of a common resource pool or a wake-up cycle for the plurality of second UEs (e.g., the resource and cycle configuration component 1644 and/or the transmission component 1634). The apparatus 1502 includes means for transmitting, to at least one of the at least one first UE or the plurality of second UEs, an indication for the at least one of a common resource pool or a wake-up cycle configured for the plurality of second UEs (e.g., the resource and cycle indication component 1646 and/or the transmission component 1634).

In one configuration, the one or more configuration parameters may be transmitted to the plurality of second UEs via a broadcast message.

In another configuration, the identification parameter may include one or more measurements for at least one of velocity, acceleration, direction, location, movement, or trajectory associated with the plurality of second UEs over the time period.

In another configuration, the indication may be transmitted to the at least one first UE or the plurality of second UEs via a broadcast message.

The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to determine one or more configuration parameters for a plurality of second UEs, the one or more configuration parameters including an identification parameter, the identification parameter being associated with a time period; determine, based on the identification parameter for at least one second UE of the plurality of second UEs, whether to transmit a warning message to the at least one second UE; and transmit, based on determining to transmit the warning message, a warning message to the at least one second UE, the warning message including an ID for the at least one second UE, the ID for the at least one second UE being based on the identification parameter.

Aspect 2 is the apparatus of aspect 1, where the at least one processor is further configured to: monitor the at least one second UE based on the identification parameter using at least one of a sensor, a camera, or a radar; and determine, based on monitoring the at least one second UE, whether the at least one second UE is in a potential collision course with the first UE, where the first UE determines to transmit the warning message to the at least one second UE based on determining that the at least one second UE is in the potential collision course with the first UE.

Aspect 3 is the apparatus of any of aspects 1 and 2, where the at least one processor is further configured to: receive, from a base station, an indication of the one or more configuration parameters for the plurality of second UEs.

Aspect 4 is the apparatus of any of aspects 1 to 3, where the at least one processor is further configured to: receive, from a base station, an indication of at least one of a common resource pool or a wake-up cycle configured for the plurality of second UEs.

Aspect 5 is the apparatus of any of aspects 1 to 4, where the first UE transmits the warning message to the at least one second UE based on the at least one of the common resource pool or the wake-up cycle configured for the plurality of second UEs.

Aspect 6 is the apparatus of any of aspects 1 to 5, where the identification parameter includes one or more measurements for at least one of velocity, acceleration, direction, location, movement, or trajectory associated with the plurality of second UEs over the time period.

Aspect 7 is the apparatus of any of aspects 1 to 6, where the at least one processor is further configured to: quantize the one or more measurements for at least one of velocity, acceleration, direction, location, movement, or trajectory associated with the plurality of second UEs over the time period into multiple levels, where each of the multiple levels includes a range for the one or more measurements.

Aspect 8 is the apparatus of any of aspects 1 to 7, where the ID for the at least one second UE is based on the one or more measurements for the at least one second UE over the time period.

Aspect 9 is the apparatus of any of aspects 1 to 8, where the ID for the at least one second UE changes dynamically over time.

Aspect 10 is the apparatus of any of aspects 1 to 9, where the at least one processor is further configured to: transmit, to the plurality of second UEs via a broadcast message, an indication of the one or more configuration parameters including the identification parameter.

Aspect 11 is the apparatus of any of aspects 1 to 10, where the warning message is transmitted to the at least one second UE via a broadcast message.

Aspect 12 is a method of wireless communication for implementing any of aspects 1 to 11.

Aspect 13 is an apparatus for wireless communication including means for implementing any of aspects 1 to 11.

Aspect 14 is a computer-readable medium storing computer executable code, where the code when executed by a processor causes the processor to implement any of aspects 1 to 11.

Aspect 15 is an apparatus for wireless communication including at least one processor coupled to a memory and configured to receive an indication of one or more configuration parameters for the second UE, the one or more configuration parameters including an identification parameter, the identification parameter being associated with a time period; receive, from at least one first UE, a warning message for the second UE, the warning message including an ID for the second UE, the ID for the second UE being based on the identification parameter; determine, based on the warning message, whether at least one distance metric is less than a threshold; and perform a warning action if the at least one distance metric is less than the threshold or ignoring the warning action if the at least one distance metric is greater than or equal to the threshold.

Aspect 16 is the apparatus of aspect 15, where the one or more configuration parameters are received from a base station or the at least one first UE via a broadcast message.

Aspect 17 is the apparatus of any of aspects 15 and 16, where the at least one processor is further configured to: receive, from a base station, a configuration for at least one of a common resource pool or a wake-up cycle for the second UE.

Aspect 18 is the apparatus of any of aspects 15 to 17, where the at least one processor is further configured to: monitor for the warning message from the at least one first UE based on the at least one of the common resource pool or the wake-up cycle for the second UE, where the second UE receives the warning message based on the monitoring.

Aspect 19 is the apparatus of any of aspects 15 to 18, where the one or more configuration parameters are received from a base station, and where the configuration is included in the one or more configuration parameters.

Aspect 20 is the apparatus of any of aspects 15 to 19, where the warning message is received from the at least one first UE via a broadcast message.

Aspect 21 is the apparatus of any of aspects 15 to 20, where the identification parameter includes one or more measurements for at least one of velocity, acceleration, direction, location, movement, or trajectory associated with the second UE over the time period.

Aspect 22 is the apparatus of any of aspects 15 to 21, where the at least one processor is further configured to: quantize the one or more measurements for at least one of velocity, acceleration, direction, location, movement, or trajectory associated with the second UE over the time period into multiple levels, where each of the multiple levels includes a range for the one or more measurements.

Aspect 23 is the apparatus of any of aspects 15 to 22, where the processor is further configured to: generate a key identifying the second UE based on the one or more measurements over the time period; and determine the warning message is directed to the second UE based on the ID in the warning message matching the key.

Aspect 24 is the apparatus of any of aspects 15 to 23, where the key changes dynamically over time.

Aspect 25 is a method of wireless communication for implementing any of aspects 15 to 24.

Aspect 26 is an apparatus for wireless communication including means for implementing any of aspects 15 to 24.

Aspect 27 is a computer-readable medium storing computer executable code, where the code when executed by a processor causes the processor to implement any of aspects 15 to 24.

Aspect 28 is an apparatus for wireless communication including at least one processor coupled to a memory and configured to configure one or more configuration parameters for a plurality of second UEs, the one or more configuration parameters including an identification parameter, the identification parameter being associated with a time period; and transmit, to at least one of at least one first UE or the plurality of second UEs, an indication of the one or more configuration parameters for the plurality of second UEs including the identification parameter.

Aspect 29 is the apparatus of aspect 28, where the one or more configuration parameters are transmitted to the plurality of second UEs via a broadcast message.

Aspect 30 is the apparatus of any of aspects 28 and 29, where the identification parameter includes one or more measurements for at least one of velocity, acceleration, direction, location, movement, or trajectory associated with the plurality of second UEs over the time period.

Aspect 31 is the apparatus of any of aspects 28 to 30, where the at least one processor is further configured to: configure at least one of a common resource pool or a wake-up cycle for the plurality of second UEs; and transmit, to at least one of the at least one first UE or the plurality of second UEs, an indication for the at least one of a common resource pool or a wake-up cycle configured for the plurality of second UEs.

Aspect 32 is the apparatus of any of aspects 28 to 31, where the indication is transmitted to the at least one first UE or the plurality of second UEs via a broadcast message.

Aspect 33 is a method of wireless communication for implementing any of aspects 28 to 32.

Aspect 34 is an apparatus for wireless communication including means for implementing any of aspects 28 to 32.

Aspect 35 is a computer-readable medium storing computer executable code, where the code when executed by a processor causes the processor to implement any of aspects 28 to 32.

What is claimed is:

1. An apparatus for wireless communication at a first user equipment (UE), comprising:
   a memory;
   a transceiver; and
   a processor, communicatively connected to the memory and the transceiver, the processor configured to:
      determine one or more configuration parameters for a plurality of second UEs, the one or more configuration parameters including an identification parameter, the identification parameter being associated with a time period;
      determine, based on the identification parameter for at least one second UE of the plurality of second UEs, whether to transmit a warning message to the at least one second UE; and
      transmit, based on determining to transmit the warning message, the warning message to the at least one second UE, the warning message including an identifier (ID) for the at least one second UE, the ID for the at least one second UE being based on the identification parameter.

2. The apparatus of claim 1, wherein the processor is further configured to:
   monitor the at least one second UE based on the identification parameter using at least one of a sensor, a camera, or a radar; and
   determine, based on monitoring the at least one second UE, whether the at least one second UE is in a potential collision course with the first UE,
   wherein the first UE determines to transmit the warning message to the at least one second UE based on determining that the at least one second UE is in the potential collision course with the first UE.

3. The apparatus of claim 1, wherein the processor is further configured to:
   receive, from a base station, an indication of the one or more configuration parameters for the plurality of second UEs.

4. The apparatus of claim 1, wherein the processor is further configured to:
   receive, from a base station, an indication of at least one of a common resource pool or a wake-up cycle configured for the plurality of second UEs.

5. The apparatus of claim 4, wherein the first UE transmits the warning message to the at least one second UE based on the at least one of the common resource pool or the wake-up cycle configured for the plurality of second UEs.

6. The apparatus of claim 1, wherein the identification parameter includes one or more measurements for at least one of velocity, acceleration, direction, location, movement, or trajectory associated with the plurality of second UEs over the time period.

7. The apparatus of claim 6, wherein the processor is further configured to:
   quantize the one or more measurements for at least one of velocity, acceleration, direction, location, movement, or trajectory associated with the plurality of second UEs over the time period into multiple levels, wherein each of the multiple levels includes a range for the one or more measurements.

8. The apparatus of claim 6, wherein the ID for the at least one second UE is based on the one or more measurements for the at least one second UE over the time period, and wherein the ID for the at least one second UE changes dynamically over time.

9. The apparatus of claim 1, wherein the processor is further configured to:
   transmit, to the plurality of second UEs via a broadcast message, an indication of the one or more configuration parameters including the identification parameter.

10. A method of wireless communication at a first user equipment (UE), comprising:
    determining one or more configuration parameters for a plurality of second UEs, the one or more configuration parameters including an identification parameter, the identification parameter being associated with a time period;
    determining, based on the identification parameter for at least one second UE of the plurality of second UEs, whether to transmit a warning message to the at least one second UE; and
    transmitting, based on determining to transmit the warning message, the warning message to the at least one second UE, the warning message including an identifier (ID) for the at least one second UE, the ID for the at least one second UE being based on the identification parameter.

11. The method of claim 10, further comprising:
    monitoring the at least one second UE based on the identification parameter using at least one of a sensor, a camera, or a radar; and
    determining, based on monitoring the at least one second UE, whether the at least one second UE is in a potential collision course with the first UE,
    wherein the first UE determines to transmit the warning message to the at least one second UE based on determining that the at least one second UE is in the potential collision course with the first UE.

12. The method of claim 10, further comprising:
receiving, from a base station, an indication of the one or more configuration parameters for the plurality of second UEs.

13. The method of claim 10, further comprising:
receiving, from a base station, an indication of at least one of a common resource pool or a wake-up cycle configured for the plurality of second UEs.

14. The method of claim 13, wherein the first UE transmits the warning message to the at least one second UE based on the at least one of the common resource pool or the wake-up cycle configured for the plurality of second UEs.

15. The method of claim 10, wherein the identification parameter includes one or more measurements for at least one of velocity, acceleration, direction, location, movement, or trajectory associated with the plurality of second UEs over the time period.

16. The method of claim 15, further comprising:
quantizing the one or more measurements for at least one of velocity, acceleration, direction, location, movement, or trajectory associated with the plurality of second UEs over the time period into multiple levels, wherein each of the multiple levels includes a range for the one or more measurements.

17. The method of claim 15, wherein the ID for the at least one second UE is based on the one or more measurements for the at least one second UE over the time period, and wherein the ID for the at least one second UE changes dynamically over time.

18. The method of claim 10, further comprising:
transmitting, to the plurality of second UEs via a broadcast message, an indication of the one or more configuration parameters including the identification parameter.

19. An apparatus for wireless communication at a second user equipment (UE), comprising:
a memory;
a transceiver; and
a processor, communicatively connected to the memory and the transceiver, the processor configured to:
receive an indication of one or more configuration parameters for the second UE, the one or more configuration parameters including an identification parameter, the identification parameter being associated with a time period;
receive, from at least one first UE, a warning message for the second UE, the warning message including an identifier (ID) for the second UE, the ID for the second UE being based on the identification parameter;
determine, based on the warning message, whether at least one distance metric is less than a threshold; and
perform a warning action if the at least one distance metric is less than the threshold or ignoring the warning action if the at least one distance metric is greater than or equal to the threshold.

20. The apparatus of claim 19, wherein the processor is further configured to:
receive, from a base station, a configuration for at least one of a common resource pool or a wake-up cycle for the second UE.

21. The apparatus of claim 20, wherein the processor is further configured to:
monitor for the warning message from the at least one first UE based on the at least one of the common resource pool or the wake-up cycle for the second UE, wherein the second UE receives the warning message based on the monitoring.

22. The apparatus of claim 19, wherein the identification parameter includes one or more measurements for at least one of velocity, acceleration, direction, location, movement, or trajectory associated with the second UE over the time period.

23. The apparatus of claim 22, wherein the processor is further configured to:
quantize the one or more measurements for at least one of velocity, acceleration, direction, location, movement, or trajectory associated with the second UE over the time period into multiple levels, wherein each of the multiple levels includes a range for the one or more measurements.

24. The apparatus of claim 22, wherein the processor is further configured to:
generate a key identifying the second UE based on the one or more measurements over the time period; and
determine the warning message is directed to the second UE based on the ID in the warning message matching the key.

25. A method of wireless communication at a second user equipment (UE), comprising:
receiving an indication of one or more configuration parameters for the second UE, the one or more configuration parameters including an identification parameter, the identification parameter being associated with a time period;
receiving, from at least one first UE, a warning message for the second UE, the warning message including an identifier (ID) for the second UE, the ID for the second UE being based on the identification parameter;
determining, based on the warning message, whether at least one distance metric is less than a threshold; and
performing a warning action if the at least one distance metric is less than the threshold or ignoring the warning action if the at least one distance metric is greater than or equal to the threshold.

26. The method of claim 25, further comprising:
receiving, from a base station, a configuration for at least one of a common resource pool or a wake-up cycle for the second UE.

27. The method of claim 26, further comprising:
monitoring for the warning message from the at least one first UE based on the at least one of the common resource pool or the wake-up cycle for the second UE, wherein the second UE receives the warning message based on the monitoring.

28. The method of claim 25, wherein the identification parameter includes one or more measurements for at least one of velocity, acceleration, direction, location, movement, or trajectory associated with the second UE over the time period.

29. The method of claim 28, further comprising:
quantizing the one or more measurements for at least one of velocity, acceleration, direction, location, movement, or trajectory associated with the second UE over the time period into multiple levels, wherein each of the multiple levels includes a range for the one or more measurements.

30. The method of claim 28, further comprising:
generating a key identifying the second UE based on the one or more measurements over the time period; and determining the warning message is directed to the second UE based on the ID in the warning message matching the key.

* * * * *